US012659713B2

(12) United States Patent
Mukherjee

(10) Patent No.: US 12,659,713 B2
(45) Date of Patent: Jun. 16, 2026

(54) APPARATUS AND METHODS FOR WIRELESS COVERAGE ENHANCEMENT USING TECHNOLOGY DETECTION

(71) Applicant: Charter Communications Operating, LLC, St. Louis, MO (US)

(72) Inventor: Amitav Mukherjee, Elk Grove, CA (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 18/411,648

(22) Filed: Jan. 12, 2024

(65) Prior Publication Data

US 2024/0155322 A1     May 9, 2024

Related U.S. Application Data

(62) Division of application No. 17/121,563, filed on Dec. 14, 2020, now Pat. No. 11,877,344.

(51) Int. Cl.
*H04W 72/0453*      (2023.01)
*H04W 8/00*      (2009.01)
(Continued)

(52) U.S. Cl.
CPC ........... *H04W 8/005* (2013.01); *H04W 16/14* (2013.01); *H04W 56/001* (2013.01);
(Continued)

(58) Field of Classification Search
CPC .... H04W 16/14; H04W 16/10; H04L 5/0032; H04L 5/0048
See application file for complete search history.

(56) References Cited

U.S. PATENT DOCUMENTS 5,991,308 A     11/1999 Fuhrmann et al.
5,995,499 A     11/1999 Hottinen et al.
(Continued)

FOREIGN PATENT DOCUMENTS

CA     3114660 A1     4/2020
EP     2294860 B1     4/2017
(Continued)

OTHER PUBLICATIONS

3GPP ETSI TS 136 212 V15.2.1 (Jul. 2018), LTE, Evolved Universal Terrestrial Radio Access (E-UTRA), Multiplexing and channel coding (3GPP TS 36.212 version 15.2.1 Release 15), 250 pages.
(Continued)

*Primary Examiner* — Yee F Lam
(74) *Attorney, Agent, or Firm* — Patent Beach PC

(57)     ABSTRACT

Apparatus and methods for improving coverage and/or power-saving in a wireless network. In one embodiment, the apparatus and methods provide mechanisms for wireless user device (such as e.g., a 3GPP-compliant UE) to utilize downlink transmissions related to a first access technology (e.g., LTE) to enhance the detection and reception of downlink transmissions from a second access technology (e.g., 5G NR). In one variant, transmissions relating both access technologies are multiplexed on a shared frequency channel; a UE trying to detect 5G NR transmissions from a gNB leverages the easier detection of certain LTE signals such as PSS to enhance detection of the 5G NR signals. Moreover, the location of the LTE PSS (or SSS) can be used to indirectly assist a UE with detection of the NR SSB, such as via reduction of the number of noise-only samples passed to the NR PSS/SSS autocorrelation detector.

20 Claims, 14 Drawing Sheets

(51) Int. Cl.
   *H04W 16/14*  (2009.01)
   *H04W 56/00*  (2009.01)
   *H04W 64/00*  (2009.01)
   *H04W 72/1268*  (2023.01)

(52) U.S. Cl.
   CPC ..... *H04W 64/003* (2013.01); *H04W 72/0453*
   (2013.01); *H04W 72/1268* (2013.01)

(56) References Cited

U.S. PATENT DOCUMENTS

| | | | |
|---|---|---|---|
| 6,154,648 | A | 11/2000 | Comer |
| 6,192,038 | B1 | 2/2001 | Wallerius et al. |
| 6,356,560 | B1 | 3/2002 | Venters et al. |
| 6,771,953 | B1 | 8/2004 | Chow et al. |
| 6,782,262 | B1 | 8/2004 | Lundborg |
| 7,573,819 | B2 | 8/2009 | Krzanowski et al. |
| 8,218,422 | B2 | 7/2012 | Venturino et al. |
| RE43,760 | E | 10/2012 | Abel et al. |
| 9,258,809 | B2 | 2/2016 | Liao et al. |
| 9,386,496 | B2 | 7/2016 | Gupta et al. |
| 9,473,957 | B2 | 10/2016 | Wellington |
| 9,526,056 | B2 | 12/2016 | Tomici et al. |
| 9,699,663 | B1 | 7/2017 | Jovancevic |
| 9,769,692 | B2 | 9/2017 | Freda et al. |
| 9,807,778 | B2 | 10/2017 | Ma et al. |
| 9,813,148 | B2 | 11/2017 | Syed et al. |
| 9,887,864 | B1 | 2/2018 | Han et al. |
| 10,003,548 | B2 | 6/2018 | Lee et al. |
| 10,033,505 | B2 | 7/2018 | Malladi et al. |
| 10,098,568 | B2 | 10/2018 | Gazdzinski |
| 10,135,730 | B2 | 11/2018 | Chou |
| 10,149,327 | B2 | 12/2018 | Au et al. |
| 10,271,351 | B1 | 4/2019 | Wang |
| 10,340,976 | B2 | 7/2019 | Kakinada et al. |
| 10,405,192 | B2 | 9/2019 | Kakinada et al. |
| 10,419,943 | B1 | 9/2019 | Wong et al. |
| 10,484,876 | B2 | 11/2019 | Shah et al. |
| 10,492,204 | B2 | 11/2019 | Kakinada et al. |
| 10,499,409 | B2 | 12/2019 | Shattil |
| 10,506,456 | B2 | 12/2019 | Lou et al. |
| 10,531,309 | B1 | 1/2020 | Li et al. |
| 10,536,858 | B2 | 1/2020 | Zapanta et al. |
| 10,536,859 | B2 | 1/2020 | Gunasekara et al. |
| 10,624,079 | B2 | 4/2020 | Xu et al. |
| 10,680,883 | B2 | 6/2020 | Hall et al. |
| 10,750,462 | B2 | 8/2020 | Kadambar et al. |
| 10,805,562 | B2 | 10/2020 | Nakamura et al. |
| 10,945,250 | B2 | 3/2021 | Kwon et al. |
| 10,980,025 | B2 | 4/2021 | Hmimy et al. |
| 11,026,205 | B2 | 6/2021 | Hmimy et al. |
| 11,129,171 | B2 | 9/2021 | Hmimy |
| 11,317,296 | B2 | 4/2022 | Vaidya et al. |
| 11,363,466 | B2 | 6/2022 | Khalid et al. |
| 11,432,284 | B2 | 8/2022 | Hmimy et al. |
| 11,438,771 | B2 | 9/2022 | Syed et al. |
| 11,457,485 | B2 | 9/2022 | Khalid et al. |
| 11,483,715 | B2 | 10/2022 | Sevindik et al. |
| 11,523,306 | B1 | 12/2022 | Chu et al. |
| 11,564,249 | B2 | 1/2023 | Talarico et al. |
| 12,009,885 | B2 | 6/2024 | Murakami |
| 12,231,248 | B2 | 2/2025 | Fehrenbach et al. |
| 2002/0126748 | A1 | 9/2002 | Rafie et al. |
| 2004/0001021 | A1 | 1/2004 | Choo et al. |
| 2004/0196834 | A1 | 10/2004 | Ofek et al. |
| 2006/0188004 | A1 | 8/2006 | Kizu et al. |
| 2008/0097913 | A1 | 4/2008 | Dicks et al. |
| 2008/0220786 | A1 | 9/2008 | Beacham |
| 2008/0220788 | A1 | 9/2008 | Stanwood et al. |
| 2009/0034443 | A1 | 2/2009 | Walker et al. |
| 2009/0129273 | A1 | 5/2009 | Zou |
| 2009/0170472 | A1 | 7/2009 | Chapin et al. |
| 2009/0253438 | A1 | 10/2009 | Chater-Lea et al. |
| 2010/0035611 | A1* | 2/2010 | Montojo .............. H04W 48/16 |
| | | | 455/434 |
| 2010/0094956 | A1 | 4/2010 | Zuckerman et al. |
| 2010/0128608 | A1 | 5/2010 | Zou et al. |
| 2010/0234042 | A1 | 9/2010 | Chan et al. |
| 2011/0014924 | A1 | 1/2011 | Hwang et al. |
| 2011/0292970 | A1 | 12/2011 | Lansford et al. |
| 2012/0188877 | A1 | 7/2012 | Chin et al. |
| 2013/0122903 | A1 | 5/2013 | Farnsworth et al. |
| 2013/0182602 | A1 | 7/2013 | Lee et al. |
| 2013/0279376 | A1* | 10/2013 | Ahmadi ................ H04W 72/04 |
| | | | 370/329 |
| 2013/0281092 | A1 | 10/2013 | Gassend |
| 2013/0288675 | A1 | 10/2013 | Gassend |
| 2013/0303145 | A1 | 11/2013 | Harrang et al. |
| 2013/0315124 | A1 | 11/2013 | Rapaport et al. |
| 2013/0336175 | A1 | 12/2013 | Um et al. |
| 2014/0106672 | A1 | 4/2014 | Jeon et al. |
| 2014/0194068 | A1 | 7/2014 | Coppage et al. |
| 2014/0199991 | A1 | 7/2014 | Mukherjee et al. |
| 2014/0241187 | A1 | 8/2014 | Barkay et al. |
| 2014/0269526 | A1 | 9/2014 | Mitola, III |
| 2014/0308986 | A1 | 10/2014 | Yang et al. |
| 2015/0055623 | A1 | 2/2015 | Li et al. |
| 2015/0071239 | A1 | 3/2015 | Zhang et al. |
| 2015/0139175 | A1 | 5/2015 | Ratasuk et al. |
| 2015/0181546 | A1* | 6/2015 | Freda .................... H04W 76/14 |
| | | | 370/336 |
| 2015/0181589 | A1 | 6/2015 | Luo et al. |
| 2015/0208262 | A1 | 7/2015 | Siomina |
| 2015/0280847 | A1 | 10/2015 | Somasundaram et al. |
| 2015/0304856 | A1 | 10/2015 | Garcia et al. |
| 2015/0334664 | A1 | 11/2015 | Sawai et al. |
| 2015/0341753 | A1 | 11/2015 | Chen et al. |
| 2015/0358968 | A1 | 12/2015 | Malladi et al. |
| 2016/0007147 | A1 | 1/2016 | Zhang et al. |
| 2016/0021661 | A1 | 1/2016 | Yerramalli et al. |
| 2016/0073259 | A1 | 3/2016 | Lee et al. |
| 2016/0128001 | A1 | 5/2016 | Tsuda |
| 2016/0165066 | A1 | 6/2016 | Yang et al. |
| 2016/0182134 | A1 | 6/2016 | Kol et al. |
| 2016/0212031 | A1 | 7/2016 | Jain et al. |
| 2016/0234746 | A1 | 8/2016 | Gopal et al. |
| 2016/0249350 | A1 | 8/2016 | Koutsimanis et al. |
| 2016/0269978 | A1 | 9/2016 | Bashar et al. |
| 2016/0330743 | A1 | 11/2016 | Das et al. |
| 2016/0353367 | A1 | 12/2016 | Vrzic et al. |
| 2016/0381600 | A1 | 12/2016 | Aksu |
| 2017/0013422 | A1 | 1/2017 | Saiwai et al. |
| 2017/0013479 | A1 | 1/2017 | Sun et al. |
| 2017/0026203 | A1 | 1/2017 | Thomas et al. |
| 2017/0150523 | A1* | 5/2017 | Patel .................... H04W 74/085 |
| 2017/0155703 | A1 | 6/2017 | Hao et al. |
| 2017/0164326 | A1 | 6/2017 | Worrall |
| 2017/0188241 | A1 | 6/2017 | Mueck et al. |
| 2017/0208540 | A1 | 7/2017 | Egner et al. |
| 2017/0208560 | A1 | 7/2017 | Papa et al. |
| 2017/0272955 | A1 | 9/2017 | Sadek et al. |
| 2017/0295497 | A1 | 10/2017 | Macmullan et al. |
| 2017/0295578 | A1 | 10/2017 | Khoshnevisan et al. |
| 2017/0303138 | A1 | 10/2017 | Barmettler et al. |
| 2017/0311290 | A1 | 10/2017 | Adjakple et al. |
| 2017/0318472 | A1 | 11/2017 | Yu et al. |
| 2017/0325251 | A1 | 11/2017 | Sadek |
| 2017/0332357 | A1 | 11/2017 | Xu et al. |
| 2017/0359731 | A1 | 12/2017 | Soldati et al. |
| 2018/0007587 | A1 | 1/2018 | Feldman et al. |
| 2018/0035463 | A1 | 2/2018 | Mallik et al. |
| 2018/0049036 | A1 | 2/2018 | Sethi et al. |
| 2018/0063736 | A1 | 3/2018 | Sadeghi et al. |
| 2018/0063758 | A1 | 3/2018 | Velu |
| 2018/0107577 | A1 | 4/2018 | Johnsson et al. |
| 2018/0115903 | A1 | 4/2018 | Badic et al. |
| 2018/0124613 | A1 | 5/2018 | Kang et al. |
| 2018/0132112 | A1 | 5/2018 | Khoshnevisan et al. |
| 2018/0146058 | A1 | 5/2018 | Somayazulu et al. |
| 2018/0146408 | A1 | 5/2018 | Meylan et al. |
| 2018/0167948 | A1 | 6/2018 | Egner et al. |
| 2018/0199214 | A1 | 7/2018 | Shen |
| 2018/0234403 | A1 | 8/2018 | Casella et al. |
| 2018/0235007 | A1 | 8/2018 | Gou et al. |

(56) References Cited

U.S. PATENT DOCUMENTS

| | | | |
|---|---|---|---|
| 2018/0242184 A1 | 8/2018 | Yerramalli et al. | |
| 2018/0255576 A1 | 9/2018 | Bhorkar et al. | |
| 2018/0279212 A1 | 9/2018 | Malik et al. | |
| 2018/0316563 A1 | 11/2018 | Kumar et al. | |
| 2018/0323938 A1 | 11/2018 | Takeda et al. | |
| 2018/0343567 A1 | 11/2018 | Ashrafi | |
| 2019/0021012 A1 | 1/2019 | Beck et al. | |
| 2019/0028182 A1 | 1/2019 | Smyth et al. | |
| 2019/0037480 A1 | 1/2019 | Sun et al. | |
| 2019/0044614 A1 | 2/2019 | Khoshnevisan et al. | |
| 2019/0081690 A1 | 3/2019 | Mueck et al. | |
| 2019/0082447 A1 | 3/2019 | Harsha et al. | |
| 2019/0098510 A1 | 3/2019 | Guo et al. | |
| 2019/0098632 A1 | 3/2019 | Martin et al. | |
| 2019/0104551 A1 | 4/2019 | Deenoo et al. | |
| 2019/0120969 A1 | 4/2019 | Hamzeh et al. | |
| 2019/0132882 A1* | 5/2019 | Li | H04L 27/2605 |
| 2019/0150182 A1 | 5/2019 | Koorapaty et al. | |
| 2019/0150190 A1* | 5/2019 | Kim | H04B 7/0695 |
| | | | 370/329 |
| 2019/0159254 A1 | 5/2019 | Garde et al. | |
| 2019/0174546 A1 | 6/2019 | Jeon et al. | |
| 2019/0182895 A1 | 6/2019 | Di Girolamo et al. | |
| 2019/0222266 A1 | 7/2019 | Cui et al. | |
| 2019/0223025 A1 | 7/2019 | Kakinada et al. | |
| 2019/0223180 A1 | 7/2019 | Fehrenbach et al. | |
| 2019/0230613 A1 | 7/2019 | Kim et al. | |
| 2019/0230706 A1 | 7/2019 | Li et al. | |
| 2019/0239190 A1 | 8/2019 | Patel et al. | |
| 2019/0253878 A1 | 8/2019 | Yu et al. | |
| 2019/0254094 A1 | 8/2019 | Babu et al. | |
| 2019/0296789 A1 | 9/2019 | Yu et al. | |
| 2019/0319699 A1* | 10/2019 | Lee | H04L 27/2666 |
| 2019/0319814 A1 | 10/2019 | Das | |
| 2019/0320490 A1 | 10/2019 | Liu et al. | |
| 2019/0349848 A1 | 11/2019 | Bali | |
| 2019/0364565 A1 | 11/2019 | Hmimy et al. | |
| 2019/0373615 A1 | 12/2019 | Cimpu et al. | |
| 2019/0387413 A1* | 12/2019 | Wong | H04L 41/0806 |
| 2019/0387515 A1 | 12/2019 | Stauffer et al. | |
| 2019/0394790 A1 | 12/2019 | Damnjanovic et al. | |
| 2019/0394791 A1 | 12/2019 | Brueck et al. | |
| 2020/0021689 A1 | 1/2020 | Sultana et al. | |
| 2020/0025629 A1 | 1/2020 | Zinger et al. | |
| 2020/0053545 A1 | 2/2020 | Wong et al. | |
| 2020/0059931 A1 | 2/2020 | Hannan et al. | |
| 2020/0083892 A1 | 3/2020 | Kundu et al. | |
| 2020/0084759 A1 | 3/2020 | Liu et al. | |
| 2020/0137806 A1* | 4/2020 | Islam | H04B 7/0408 |
| 2020/0146058 A1 | 5/2020 | Xu et al. | |
| 2020/0187150 A1 | 6/2020 | Eisner | |
| 2020/0221392 A1 | 7/2020 | Xue et al. | |
| 2020/0288523 A1 | 9/2020 | Patil et al. | |
| 2020/0296627 A1 | 9/2020 | Arvidson et al. | |
| 2020/0305159 A1 | 9/2020 | Raghothaman et al. | |
| 2020/0313838 A1* | 10/2020 | Jin | H04W 48/12 |
| 2020/0337054 A1* | 10/2020 | Kwok | H04W 48/18 |
| 2020/0344515 A1 | 10/2020 | Wong et al. | |
| 2021/0037444 A1 | 2/2021 | Harel | |
| 2021/0051653 A1 | 2/2021 | Park et al. | |
| 2021/0058863 A1 | 2/2021 | Kalhan | |
| 2021/0076424 A1 | 3/2021 | Mukherjee et al. | |
| 2021/0126662 A1 | 4/2021 | Solichien | |
| 2021/0127423 A1 | 4/2021 | Park et al. | |
| 2021/0167883 A1 | 6/2021 | Yoon | |
| 2021/0204322 A1 | 7/2021 | Lou et al. | |
| 2021/0211887 A1 | 7/2021 | Jones | |
| 2021/0219303 A1 | 7/2021 | Khalid et al. | |

| | | | |
|---|---|---|---|
| 2021/0234648 A1* | 7/2021 | Parekh | H04W 72/04 |
| 2021/0235495 A1 | 7/2021 | Xu et al. | |
| 2021/0266914 A1 | 8/2021 | Yoo et al. | |
| 2021/0274506 A1 | 9/2021 | Raghavan et al. | |
| 2021/0376905 A1 | 12/2021 | Zhou et al. | |
| 2022/0007374 A1 | 1/2022 | Sevindik et al. | |
| 2022/0132524 A1 | 4/2022 | Mueck et al. | |
| 2022/0167176 A1 | 5/2022 | Khalid | |
| 2022/0183093 A1 | 6/2022 | Sevindik et al. | |
| 2022/0240304 A1 | 7/2022 | Wang et al. | |
| 2022/0407653 A1 | 12/2022 | Kakishima et al. | |
| 2023/0012713 A1 | 1/2023 | Khalid et al. | |

FOREIGN PATENT DOCUMENTS

| | | | |
|---|---|---|---|
| EP | 3360382 | B1 | 7/2021 |
| GB | 2585394 | A | 1/2021 |
| KR | 20140070528 | A | 6/2014 |
| WO | WO-2005065198 | A2 | 7/2005 |
| WO | WO-2013020599 | A1 | 2/2013 |
| WO | WO-2017130494 | A1 | 8/2017 |
| WO | WO-2017186294 | A1 | 11/2017 |
| WO | WO-2017195078 | A1 | 11/2017 |
| WO | WO-2018144976 | A2 | 8/2018 |
| WO | WO-2019067120 | A1 | 4/2019 |
| WO | WO-2019132980 | A1 | 7/2019 |
| WO | WO-2019139691 | A1 | 7/2019 |
| WO | WO-2019199784 | A3 | 11/2019 |
| WO | WO-2020167222 | A2 | 8/2020 |

OTHER PUBLICATIONS

3GPP TS 38.331, Jun. 2019.

3GPP TS 38.413 3rd Generation Partnership Project; Technical Specification Group Radio Access Network; NG-RAN; NG Application Protocol (NGAP) (Release 16), (Dec. 2019) 335 pages.

Deering, S., et al., "Internet Protocol, Version 6 (IPv6) Specification," Internet Engineering Task Force (IETF) RFC 2460, Dec. 1998, 39 pages.

"Internet Protocol, DARPA Internet Program, Protocol Specification", IETF RCF 791, Sep. 1981, 50 pages.

Nokia 5G New Radio (NR): Physical Layer Overview and Performance, IEEE Communication Theory Workshop, 2018 by A. Ghosh, May 15, 2018, 38 pages.

3GPP Release 13 to Release 15 and Beyond, "Wireless Technology Evolution to Wards 5G:" Published by 5G americas , Feb. 2017, 243 pages.

Article 5 of the Radio Regulations (edition 2001), Introduction to International Radio Regulations, 161 pages.

Federal Communications Commission, Table of Frequency Allocations as codified at Section 2.106, 2014, 141 pages.

Kutacz T., et al., "Coordinated Spectrum Allocation and Co existence Management in CBRS-SAS Wireless Networks." IEEE Access, vol. 07, pp. 139294-139316. (Year: 2019).

Palola M., et al., "Field Trial of the 3.5 GHz Citizens Broadband Radio Service Governed by a Spectrum Access System (SAS)," IEEE International Symposium on Dynamic Spectrum Access Networks, 2017, 9 pages.

Ramaswamy V and Correia J.T., et al., "Enabling Spectrum Sharing Between LTE and RADAR Systems in S-band", The MITRE Corporation 202 Burlington Road, Bedford, MA 01730, 2017, 06 Pages.

RP-193240, New SID on NR coverage enhancement, 2019.

Souryal, Michael R., et al., "Effect of Federal Incumbent Activity on CBRS Commercial Service", International Symposium on Dynamic Spectrum Access Networks (DySPAN), IEEE 2019, 5 pages.

* cited by examiner

400

START

402

DETECT SIGNALS ASSOCIATED WITH FIRST TECHNOLOGY

404

UTILIZE DETECTED SIGNALS OF FIRST TECHNOLOGY TO ASSIST IN DETECTION OF SIGNALS OF SECOND ACCESS TECHNOLOGY

406

OPERATE USING SECOND ACCESS TECHNOLOGY

CONTINUE

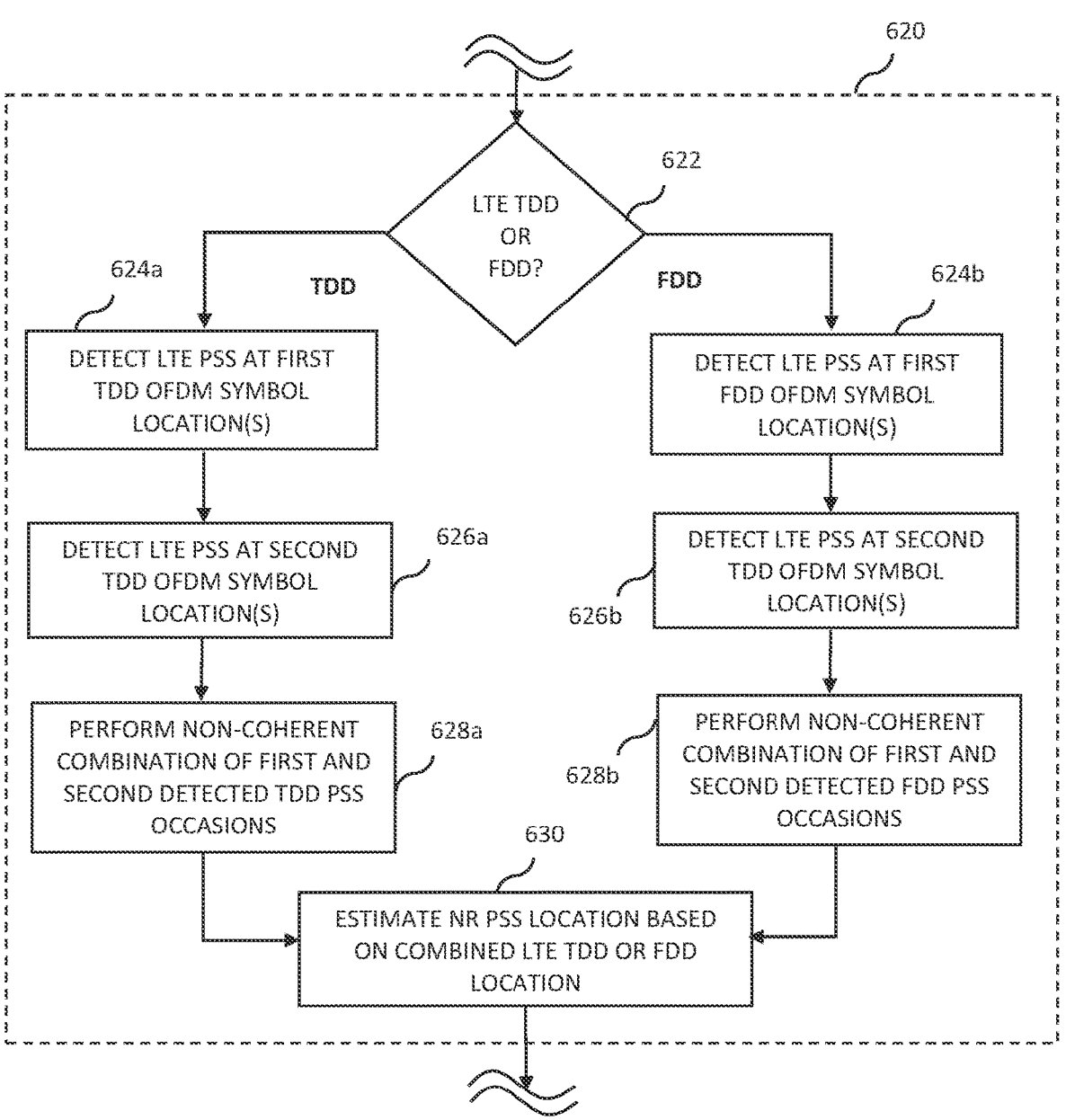

620

622

LTE TDD
OR
FDD?

624a

TDD

FDD

624b

DETECT LTE PSS AT FIRST
TDD OFDM SYMBOL
LOCATION(S)

DETECT LTE PSS AT FIRST
FDD OFDM SYMBOL
LOCATION(S)

DETECT LTE PSS AT SECOND
TDD OFDM SYMBOL
LOCATION(S)

626a

DETECT LTE PSS AT SECOND
TDD OFDM SYMBOL
LOCATION(S)

626b

PERFORM NON-COHERENT
COMBINATION OF FIRST AND
SECOND DETECTED TDD PSS
OCCASIONS

628a

PERFORM NON-COHERENT
COMBINATION OF FIRST AND
SECOND DETECTED FDD PSS
OCCASIONS

628b

630

ESTIMATE NR PSS LOCATION BASED
ON COMBINED LTE TDD OR FDD
LOCATION

Figure 9:
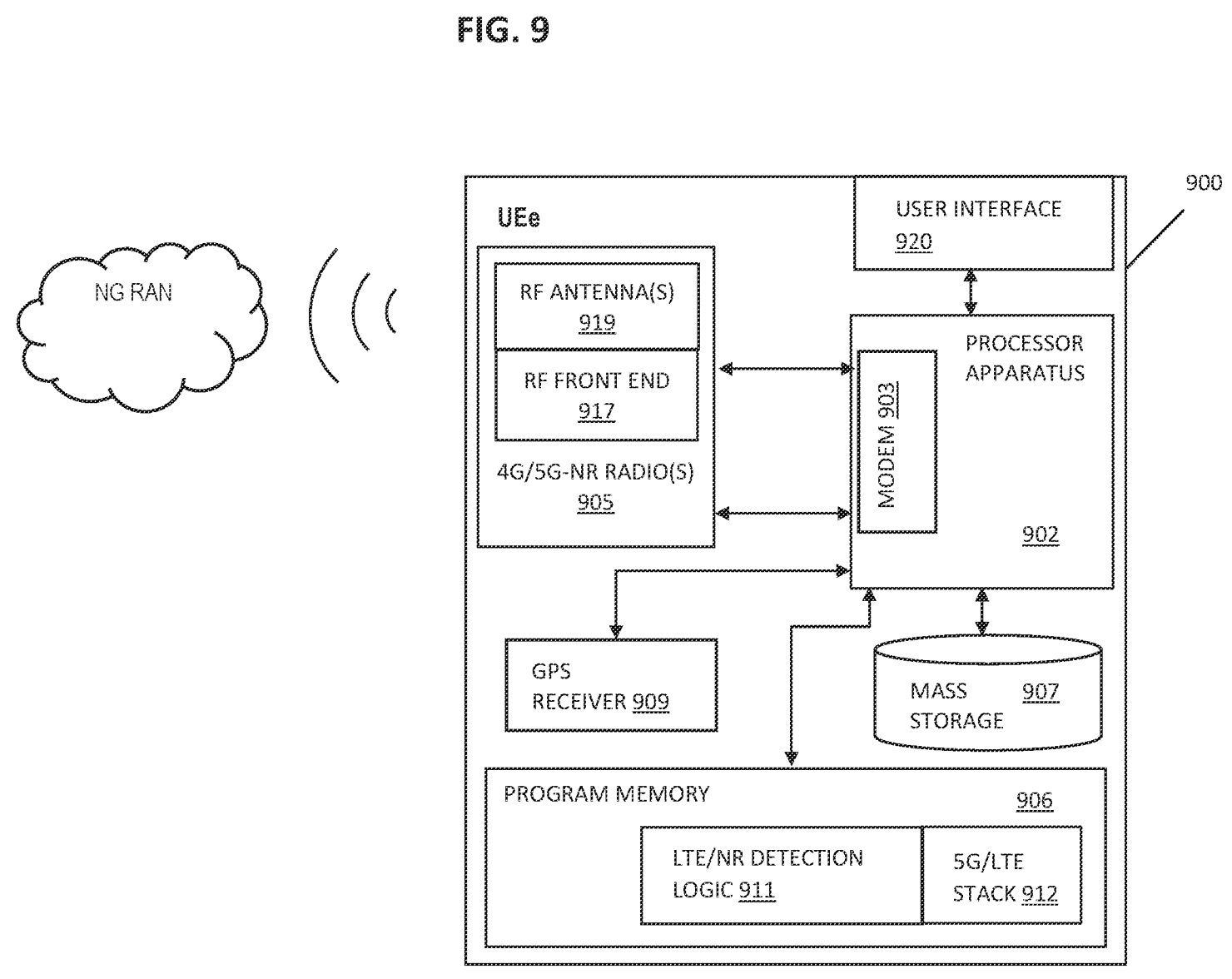

UEe

USER INTERFACE 920

PROCESSOR APPARATUS 902

MODEM 903

RF ANTENNA(S) 919

RF FRONT END 917

4G/5G-NR RADIO(S) 905

MASS STORAGE 907

GPS RECEIVER 909

PROGRAM MEMORY 906

LTE/NR DETECTION LOGIC 911

5G/LTE STACK 912

NG RAN

APPARATUS AND METHODS FOR WIRELESS COVERAGE ENHANCEMENT USING TECHNOLOGY DETECTION

PRIORITY

This application is a divisional of and claims priority to co-owned U.S. patent application Ser. No. 17/121,563 of the same title filed on Dec. 14, 2020, and issuing as U.S. Pat. No. 11,877,344 on Jan. 16, 2024, which is incorporated herein by reference in its entirety.

COPYRIGHT

BACKGROUND

1. Technological Field

The present disclosure relates generally to the field of wireless devices and networks thereof, and specifically in one exemplary aspect to enhancing coverage for wireless devices utilizing licensed, quasi-licensed, and/or unlicensed spectrum.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
| | 1900 MHz PCS, Band 2 (GSM/GPRS/EDGE). |
| | 850 MHz Cellular, Band 5 (UMTS/HSPA+ up to 21 Mbit/s). |
| | 1900 MHz PCS, Band 2 (UMTS/HSPA+ up to 21 Mbit/s). |
| 4G | 700 MHz Lower B/C, Band 12/17 (LTE). |
| | 850 MHz Cellular, Band 5 (LTE). |
| | 1700/2100 MHz AWS, Band 4 (LTE). |
| | 1900 MHz PCS, Band 2 (LTE). |
| | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |

TABLE 2-continued

| Frequency range | Type | Center frequency | Availability | Licensed users |
|---|---|---|---|---|
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs (e.g., Wi-Fi) and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a node or "hotspot," a physical location at which the user may obtain access by connecting to routers, APs, etc. that are within wireless range.

5G New Radio (NR) and NG-RAN (Next Generation Radio Area Network)

NG-RAN or "NextGen RAN (Radio Area Network)" is part of the 3GPP "5G" next generation radio system. 3GPP is currently specifying Release 17 (aka "Rel-17") NG-RAN, its components, and interactions among the involved nodes including so-called "gNBs" (next generation Node B's or eNBs). NG-RAN will provide high-bandwidth, low-latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

5G NR key aspects were originally specified in 3GPP Release 15 (Rel-15) NG-RAN (and further refined in follow-on Release 16). For instance, low latency communication, beam-based channels, massive Multiple Input Output (MIMO) with large numbers of controllable antenna elements, scalable-width subchannels, carrier aggregation, cloud Radio-Access Network (RAN) capability, network slicing, and coexistence with LTE were first specified in Release 15.

In some aspects, Rel-17 NG-RAN leverages technology and functions of extant LTE/LTE-A (colloquially referred to as 4G or 4.5G), as bases for further functional development and capabilities. For instance, Rel-17 is bringing foundational enhancements to improve overall network capacity, coverage, latency, device power, and mobility. In Rel-17, there will be a focus on massive MIMO (mMIMO), beam management, for mmWave, multi-transmission-point operations, higher mobility. In addition, Rel-17 will provide support for Multi-Universal Subscriber Identity (UE) MUSIM UEs.

FIG. 1 illustrates the 3GPP 5G NR architecture 100.

Dynamic spectrum sharing (DSS) is a mechanism (first included in Rel-15) for NR-LTE coexistence when both access technologies are deployed on a shared carrier in FR1. Specifically, a gNB with DSS carrier capability can simultaneously serve both LTE and NR UEs (in a backward-compatible manner for LTE). Downlink (DL) and uplink (UL) transmissions of both LTE and NR can be accommodated on the DSS carrier, and if the LTE frame structure is TDD (time division duplex) versus FDD, an NR static or semi-static TDD configuration (versus dynamic TDD) can be chosen to align with the LTE TDD configuration.

In DSS, dynamic resource sharing between LTE and NR transmissions is enabled, in order to enhance efficiency and scalability with varying LTE and NR traffic loads.

In some scenarios, mutual interference between LTE and NR may occur, which can inter alia, degrade NR coverage. Specifically, the LTE cell-specific reference signals (CRS) in each DL subframe may cause interference with NR DL control channels and reference signals. Conversely, NR DL data and control channels may cause interference with LTE CRS and LTE DL control channels (e.g., PDCCH/PHICH/PCFICH). LTE UL channels may further collide with NR UL channels, which can be avoided by the relevant scheduler algorithm(s) in the gNB.

Rel-15 NR (and subsequent) has several mechanisms to mitigate interference to LTE users. These mechanisms include: (i) use of a "rate-matching" configuration of the DL PDSCH data by the RRC layer—this is intended to avoid transmissions overlapping with LTE CRS of the carrier; (ii) flexible NR PDCCH symbol allocation for mini-slot (Type B) scheduling—this is intended to avoid the LTE CRS/

PDCCH/PHICH; and (iii) flexible NR PUCCH locations—this is intended to avoid the LTE PUCCH at carrier edges via scheduling.

Several DSS enhancements have been added in 3GPP Rel-16 and Rel-17, including for example rate-matching of NR PDSCH around multiple LTE CRS patterns.

In DSS, LTE and NR may or may not have the same OFDM numerology (subcarrier spacing or SCS and symbol length), in that LTE has only 15 kHz SCS, while NR can have various multiples thereof. However, resource sharing is most efficient when the SCS is aligned, thereby obviating the need for intra-carrier guard bands. An example of a DL LTE subframe/NR slot 200 where both RATs (4G and 5G) have the same SCS/numerology of 15 kHz and NR PDSCH is rate-matched around LTE CRS, is shown in FIG. 2.

Table 4 illustrates various properties attributed to certain LTE and NR DL physical-layer signals.

TABLE 4

| Signal/Channel | LTE | NR |
|---|---|---|
| PSS (Primary Synchronization Signal) | Length-63 Zadoff Chu sequence with 3 possible sequences. | Length-127 m-sequence with 3 possible sequences. |
| | Fixed at center of carrier in frequency. | Frequency location dependent upon synchronization raster points. SCS of 15 kHz or 30 kHz in FR1. |
| | SCS of 15 kHz. Transmitted every 5 ms. | Transmitted twice per slot within SSB burst set; burst set spans up to 5 ms and is transmitted every 5, 10, 20, 40, 80, or 160 ms (default UE assumption is 20 ms periodicity). |
| SSS (Secondary Synchronization Signal) | Length-63 m-sequence with 168 possible sequences. Fixed at center of carrier in frequency. SCS of 15 kHz. Transmitted every 5 ms in symbol before (FDD)/after PSS. | Length-127 m-sequence with 336 possible sequences. Frequency location and SCS same as PSS. Transmission period same as PSS. |
| CRS (Cell-specific Reference Signal) | Pseudo-random sequences. Transmitted twice per LTE slot, for e.g., in OFDM symbols #0, #4, #7, #11 in every DL subframe, with frequency spacing of 6 subcarriers per antenna port. | N/A |

As indicated in Table 4 above, LTE and NR PSS are typically detected by the UE based on autocorrelation or cross-correlation of the received signal samples. The auto or cross-correlation peak level(s) is compared with a predetermined threshold to determine if PSS is present.

Further, the NR PSS and SSS together indicate the PCI, and constitute a Synchronization Signal/PBCH block (or "SSB") along with the PBCH. A UE also determines cell timing (slot and half-frame/frame boundaries) and SFN (system frame number) by detecting the full SSB.

It is noted that there are two SSBs in an NR slot (such as the slot 200 of FIG. 2), with four OFDM symbols per SSB (1 symbol for PSS, 1 symbol for SSS, and 2 symbols for PBCH and PBCH DMRS). See FIG. 3. The possible time locations of SSBs within a slot half-frame are determined by sub-carrier spacing, and the periodicity of the half-frames where SSBs are transmitted is configured by the network. During a half-frame, different SSBs may be transmitted in different spatial directions. SSBs associated with an RMSI (remaining minimum system information) are located on the NR synchronization raster, which is band dependent.

Unaddressed Issues of NR Coverage

NR coverage enhancement (CE) is a general feature of interest for network operators deploying NR technology. CE for both DL and UL data/control channels is desirable in order to, inter alia, reduce the density of cell sites required for NR coverage. NR CE is a 3GPP Rel-17 Study Item (see RP-193240, New SID on NR coverage enhancement, 2019, which is incorporated herein by reference in its entirety) having several objectives, including to study potential coverage enhancement solutions for specific scenarios for both frequency ranges (FR1 and FR2). Target scenarios and services to be evaluated include (i) urban scenarios (i.e., an outdoor gNB serving indoor UEs); (ii) a rural scenario (including extreme long distance rural scenario) for FR1; (iii) an indoor scenario (indoor gNB serving indoor UEs); (iv) urban/suburban scenarios (including outdoor gNBs serving outdoor UEs, and outdoor gNBs serving indoor UEs) for FR2; (v) TDD and FDD for FR1; (vi) VoIP and eMBB service for FR1; and (vii) eMBB service as first priority and VoIP as second priority for FR2. Notably, however, the Rel-17 CE Study Item does not explicitly address DSS scenarios.

However, detection of NR cells may be less reliable than that for LTE due to the greater sparsity of NR synchronization sequences in the time domain, increased uncertainty of frequency-domain location of NR PSS/SSS signals, and unknown SSB beam direction. Similarly, detection of the start of a NR DL transmission may be less reliable than for LTE due to the absence of cell-specific reference signals (CRS).

Additionally, use of DSS may further degrade NR coverage due to interference from LTE transmissions to NR on the shared carrier.

Despite these issues, multiple network operators have announced their intent to deploy DSS functionality, in order to avoid solutions such as spectrum "re-farming." Moreover, DSS functionality is supported by major UE modem suppliers.

Accordingly, improved apparatus and methods are needed to, inter alia, to enhance NR cell detection, and consequently the coverage of NR DL and UL transmissions.

SUMMARY

The present disclosure addresses the foregoing needs by providing, inter alia, apparatus and methods for enhanced NR cell detection, and consequently enhanced coverage of NR DL and UL transmissions.

In a first aspect of the disclosure, a method of data processing by a user device configured for reception of first and second wireless signals is described. In one embodiment, the method includes utilizing data contained within the first wireless signals to enhance detection of the second wireless signals, wherein: the first wireless signals are associated with a first wireless access technology; and the second wireless signals are associated with a second wireless access technology.

In one variant of the method, the first wireless signals and the second wireless are multiplexed on a frequency channel shared by the first wireless access technology and the second wireless access technology.

In another variant, the first wireless access technology includes 3GPP (Third Generation Partnership Project) LTE (Long Term Evolution) technology, and the second wireless access technology includes 3GPP 5G NR (Fifth Generation New Radio) technology. In one implementation thereof, the first wireless signals comprise at least one of a Primary Synchronization Signal (PSS) or a Secondary Synchronization Signal (SSS).

In another variant, the enhancement of the detection of the second wireless signals includes enhancing a coverage area of the second wireless technology.

In yet another variant, the enhancement of the detection of the second wireless signals includes enhancing detection of the second wireless signals via a known protocol-based relationship between at least one aspect of the first wireless signals and at least one aspect of the second wireless signals.

In one implementation thereof, the known protocol-based relationship between at least one aspect of the first wireless signals and at least one aspect of the second wireless signals includes a known relationship between symbol numerology within the first wireless signals and the second wireless signals.

In another variant, the utilizing data contained within the first wireless signals to enhance detection of the second wireless signals includes using a signal element within the first wireless signals which requires reduced complexity to decode as compared to a corresponding signal element within the second wireless signals.

In a further variant, the utilizing data contained within the first wireless signals to enhance detection of the second wireless signals includes using location information relating to a signal element within the first wireless signals to reduce a complexity of detection of a signal element within the second wireless signals.

In still another variant, the using location information relating to a signal element within the first wireless signals to reduce a complexity of detection of a signal element within the second wireless signals includes causing a reduction of a number of noise-only samples passed to an autocorrelation detector associated with the second wireless access technology.

In another aspect of the disclosure, a computerized user device configured to communicate with a wireless network one or more access nodes is described. In one embodiment, the at least one access node supports at least first and second wireless access technologies, and the computerized user device comprise: processor apparatus; wireless interface apparatus in data communication with the processor apparatus and configured to transmit and receive wireless signals in one or more radio frequency (RF) bands; and computerized logic in data communication with the processor apparatus.

In one variant, the logic is configured to, when executed, cause the computerized user device to: receive at least one data element from one of the one or more access nodes via the first wireless access technology; process the received at least one data element to produce information facilitating detection of signals transmitted by the one access node using the second wireless access technology; and utilize the information as part of detection of the signals.

In another variant, the one wireless access node includes a 5G NR (New Radio)-compliant gNB (gNode B) operating in a DSS (Dynamic Spectrum Sharing) mode; the one or more RF bands includes one or more RF bands within FR1 (Frequency Range 1); and the computerized user device includes a DSS-capable 5G NR-compliant UE (user equipment) capable of also receiving and decoding 3GPP LTE (Long Term Evolution) signals within the one or more RF bands.

In a further variant the at least one data element includes at least one of a Primary Synchronization Signal (PSS) or a Secondary Synchronization Signal (SSS).

In still another variant, the utilization of the information as part of detection of the signals includes utilizing at least one of a timing relationship or a known channel spacing within a subframe to infer a presence of a second data element present within the signals.

In another variant the utilization of the information as part of detection of the signals includes using information relating to a location of the at least one element to reduce a complexity of detection of a data element within the signals by at least a reduction of a number of noise-only samples passed to an autocorrelation detector associated with the second wireless access technology.

In yet another variant, the wireless network includes a network utilizing quasi-licensed radio frequency (RF) spectrum within a CBRS (Citizens Broadband Radio Service) band, and the computerized user device includes a CBRS-compliant FWA (fixed wireless access) device disposed at a user premises.

In another aspect, a computerized access node configured for use within a wireless network is disclosed. In one embodiment, the node is configured for wireless communication with a plurality of computerized user devices and at least one other computerized access node, and includes: processor apparatus; wireless interface apparatus in data communication with the processor apparatus and configured to transmit and receive wireless signals in one or more radio frequency (RF) bands; and computerized logic in data communication with the processor apparatus and configured to, when executed, cause the computerized access node to: receive at least one data element from the at least one other access node via the first wireless access technology; process the received at least one data element to produce information facilitating detection of signals transmitted by the at least one other access node using the second wireless access technology; and utilize the information as part of detection of the signals.

In one variant, the computerized access node and the at least one other access node comprise part of an IAB (Integrated Access Backhaul). In one implementation thereof, the computerized access node is configured to utilize the at least one other access node as its backhaul to a core of the wireless network. For instance, in one exemplary configuration, the utilization of the at least one other access node as its backhaul to a core of the wireless network includes use of mmWave signals within 3GPP FR2 (Frequency Range 2); and the first wireless access technology is configured to operate in FR1 (Frequency Range 1) only.

In another aspect of the disclosure, an enhanced UE (user equipment) apparatus, or UEe, for use within a wireless network is disclosed. In one embodiment, the UEe includes both 4G/4.5G E-UTRAN-based and 5G NR-based wireless interfaces and associated protocol stacks so as to support DSS (Dynamic Spectrum Sharing) and LTE-based NR detection operation.

In another aspect of the disclosure, an IAB-enabled wireless access node is disclosed. In one embodiment, the node is configured as an enhanced 3GPP-compliant eNB/gNB (e.g., 4.5G and/or 5G) and includes: a processor apparatus; a wireless modem chipset in data communication with processor apparatus; a program memory in data communication with processor apparatus; one or more RF front end modules; and a network interface module configured for data communication with a core network (e.g., 5GC). In one implementation, the program memory includes at least one computer program which is configured to, when executed to the processor apparatus, causes transmission of a communication signals in support of one or more IAB configurations.

In another embodiment, the enhanced node is configured as a 5G NR gNB (gNBe) having at least one CU and a plurality of enhanced DU (DUe) in data communication therewith.

In another aspect of disclosure, a computer readable apparatus is disclosed. In one embodiment, the apparatus includes a storage medium configured to store one or more computer program. In embodiment, the apparatus includes a program memory, flash memory, or HDD or SSD on a computerized controller device, such as MSO or MNO network controller. In another embodiment, the apparatus includes a program memory, flash memory, or HDD or SDD on a computerized access node (e.g. gNBe) or a user device (e.g., UEe).

In still a further aspect of the disclosure, methods and apparatus for reducing the complexity of e.g., NR cell detection are disclosed. In one embodiment, the methods and apparatus include use of a first "pointer" technology which has reduced complexity of detection relative to NR technology to simplify processing subsequently conducted as part of the NR cell detection.

In another embodiment, signals associated with the "pointer" technology have a known or prescribed relationship with those of the NR technology, such as being multiplexed into a common carrier or band.

In yet another aspect, methods and apparatus for enhancing coverage area of a wireless node are disclosed. In one embodiment, the enhanced coverage is accomplished via enhanced sensitivity to signals of a second technology type transmitted at a given power (e.g., EIRP), the enhanced sensitivity relating to use of one or more easily detected first technologies such as LTE, NB-IoT, or eMTC.

In yet another aspect, methods and apparatus for reducing at least one of network CAPEX or OPEX are disclosed. In one embodiment, the methods an apparatus allow for reduced node (e.g., gNB) density within a given area based on the aforementioned enhanced sensitivity. In one variant, a planned IAB (Integrated Access Backhaul) architecture is used, and the density of the gNBs therein can be reduced thereby saving CAPEX and OPEX.

In yet another aspect, methods and apparatus for performing non-coherent combining of data (e.g., symbols), such as within a TDD or FDD data stream, are disclosed. In one embodiment, symbols at multiple RACH Occasions (ROs) are detected and non-coherently combined in order to generate detection information which can subsequently (or iteratively) be used in detection of signals associated with other types of technologies such as 5G NR.

In still another aspect, methods and apparatus for processing received signals associated with a first access technology in order to control one or more logical functions of a second access technology are disclosed. In one embodiment, the first technology includes LTE signals; specifically, LTE CRS detection is used as a gating factor or condition precedent for other functions such as e.g., group common PDCCH (GC-PDCCH) detection, such as to determine channel occupancy parameters for deployments using unlicensed or other spectrum which require contention or arbitration for wireless medium access (e.g., 5G NR-U).

In a further aspect, an integrated circuit (IC) apparatus is disclosed. In one embodiment, the IC apparatus includes one or more individual ICs or chips that are configured to contain or implement computerized logic configured to enable LTE, NB-IoT, or e/mMTC-based detection of NR signals within a wireless-enabled user device.

These and other aspects shall become apparent when considered in light of the disclosure provided herein.

BRIEF DESCRIPTION OF THE DRAWINGS

FIG. 6a is a logical flow diagram illustrating one implementation of the methodology of LTE TDD/FDD-based detection of NR signals of FIG. 6, wherein non-coherent combining of multiple symbols is utilized.

FIG. 9 is a functional block diagram illustrating one embodiment of a user device (e.g., enhanced UE or user equipment such as a mobile device) configured according to the disclosure.

FIGS. 2-12 © Copyright 2020 Charter Communications Operating, LLC. All rights reserved.

DETAILED DESCRIPTION

Figure 1:
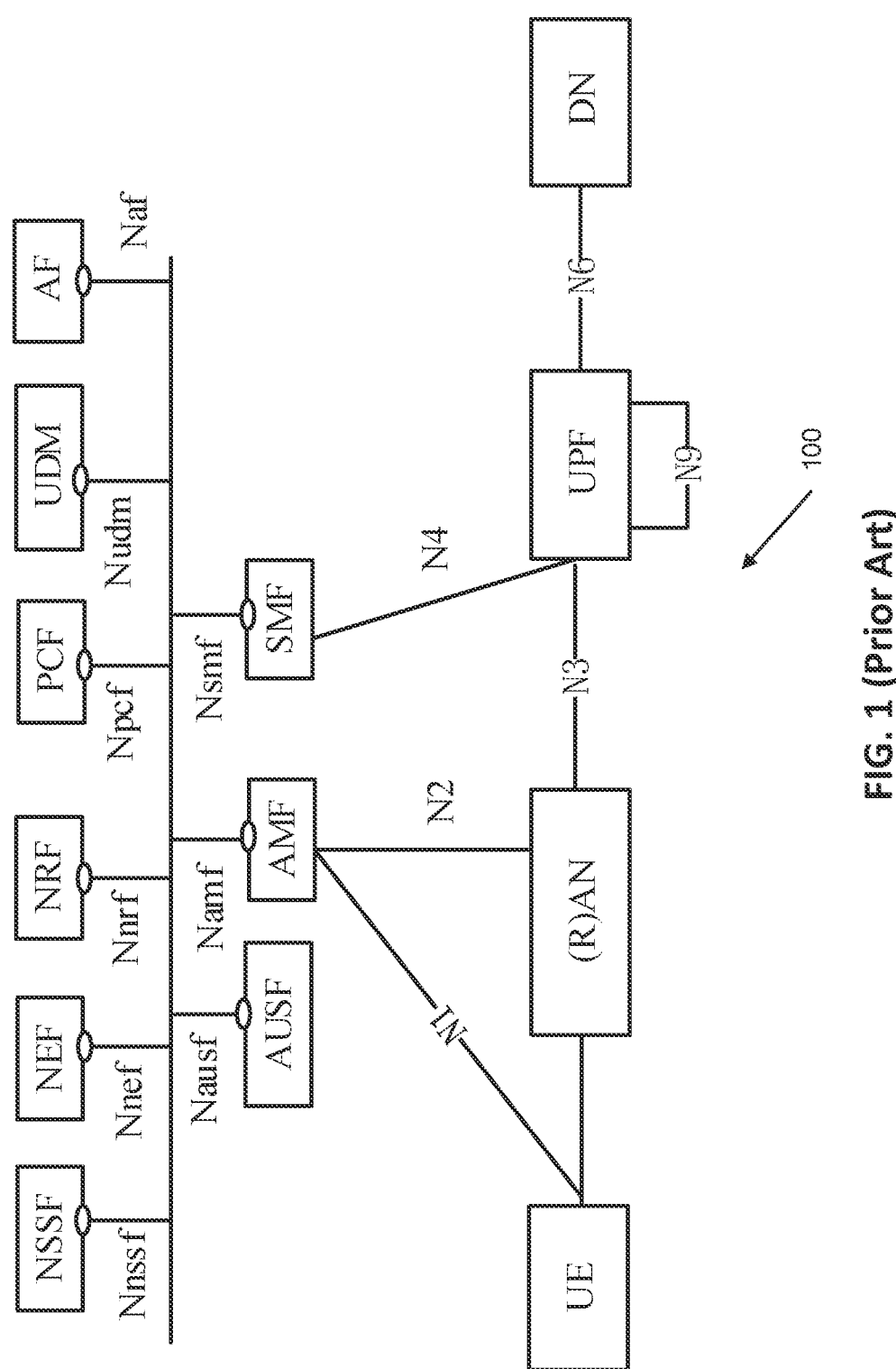
FIG. 1 is a block diagram illustrating a 5G NR network architecture.
Figure 2:
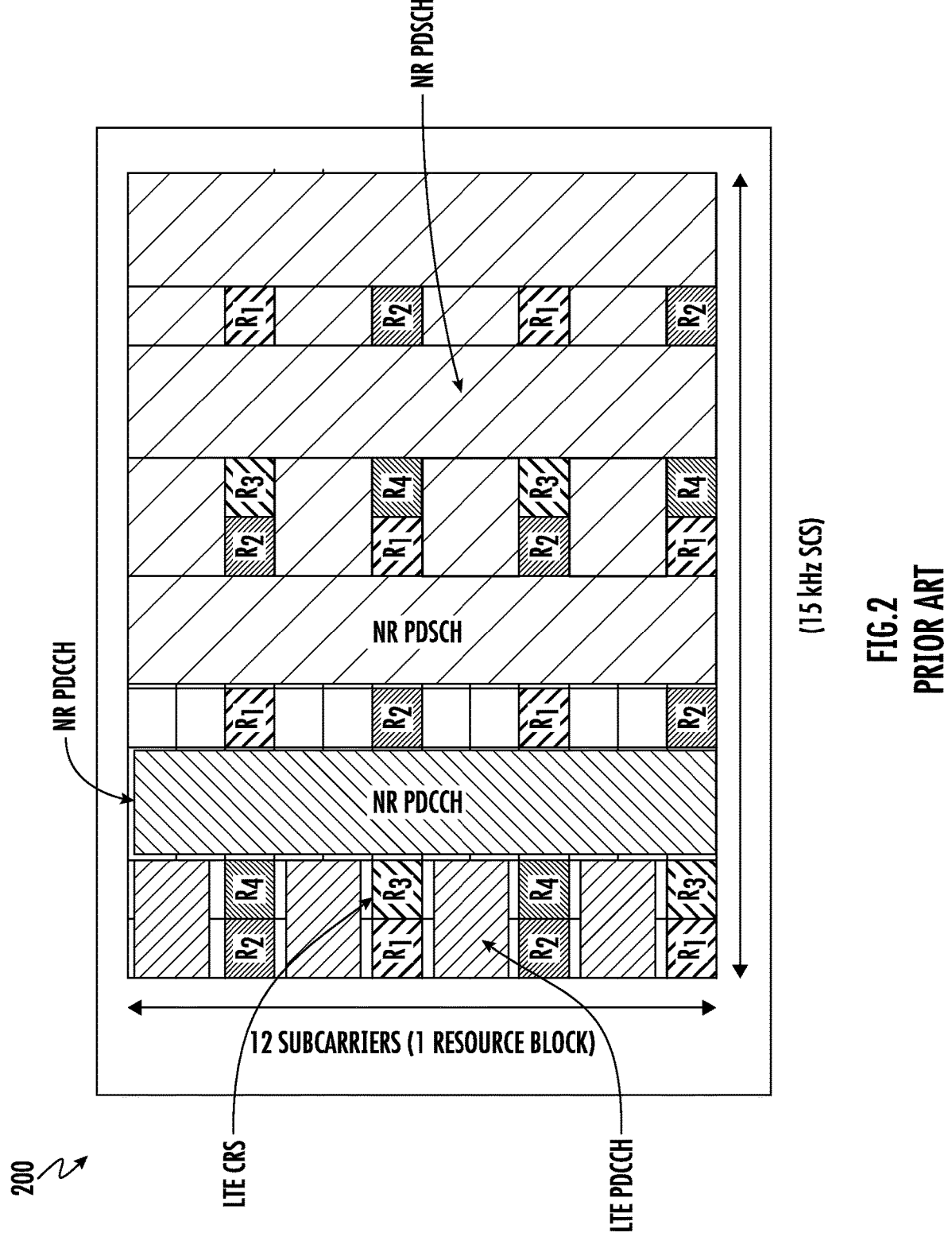
FIG. 2 is a graphical illustration of a prior art 3GPP LTE subframe/NR slot, wherein both LTE and NR RATs have the same numerology (15 kHz), and the NR PDSCH is rate-matched around an LTE CRS.
Figure 3:
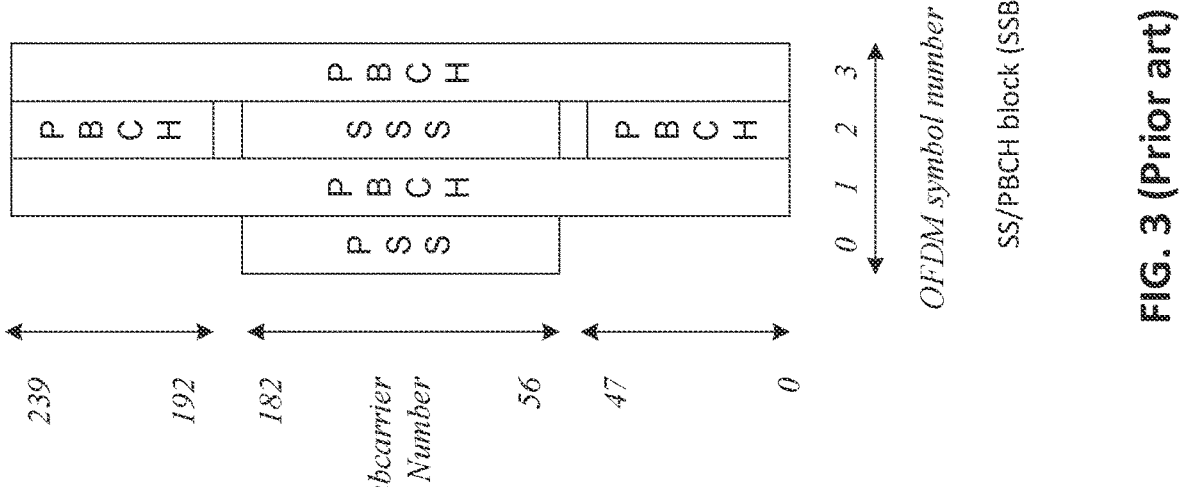
FIG. 3 is a graphical representation of a prior art DSS/PBCH slot configuration (subcarrier number vs. OFDM symbol number).

Reference is now made to the drawings wherein like numerals refer to like parts throughout.

As used herein, the term "access node" refers generally and without limitation to a network node which enables communication between a user or client device and another entity within a network, such as for example a CBRS CBSD, small cell, a cellular xNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment. Applications as used herein may also include so-called "containerized" applications and their execution and management environments such as VMs (virtual machines) and Docker and Kubernetes.

As used herein, the term "CBRS" refers without limitation to the CBRS architecture and protocols described in Signaling Protocols and Procedures for Citizens Broadband Radio Service (CBRS): Spectrum Access System (SAS)—Citizens Broadband Radio Service Device (CBSD) Interface Technical Specification—Document WINNF-TS-0016, Version V1.2.1. 3, January 2018, incorporated herein by reference in its entirety, and any related documents or subsequent versions thereof.

As used herein, the term "central unit" or "CU" refers without limitation to a centralized logical node within a wireless network infrastructure. For example, a CU might be embodied as a 5G/NR gNB Central Unit (gNB-CU), which is a logical node hosting RRC, SDAP and PDCP protocols of the gNB or RRC and PDCP protocols of the gNB that controls the operation of one or more gNB-DUs, and which terminates the F1 interface connected with one or more DUs (e.g., gNB-DUs) defined below.

As used herein, the terms "client device" or "user device" or "UE" include, but are not limited to, set-top boxes (e.g., DSTBs), gateways, modems, FWA devices, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "distributed unit" or "DU" refers without limitation to a distributed logical node within a wireless network infrastructure. For example, a DU might be embodied as a 5G/NR gNB Distributed Unit (gNB-DU), which is a logical node hosting RLC, MAC and PHY layers of the gNB or en-gNB, and its operation is partly controlled by gNB-CU (referenced above). One gNB-DU supports one or multiple cells, yet a given cell is supported by only one gNB-DU. The gNB-DU terminates the F1 interface connected with the gNB-CU.

As used herein, the term "DOCSIS" refers to any of the existing or planned variants of the Data Over Cable Services Interface Specification, including for example DOCSIS versions 1.0, 1.1, 2.0, 3.0, 3.1 and 4.0 and any EuroDOCSIS counterparts or derivatives relating thereto, as well as so-called "Extended Spectrum DOCSIS".

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, (G)DDR/2/3/4/5/6 SDRAM, EDO/FPMS, RLDRAM, SRAM, "flash" memory (e.g., NAND/NOR), 3D memory, stacked memory such as HBM/HBM2, and spin Ram, PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOC SIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with any of 3GPP Release 15-17, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. 16-QAM, 64-QAM, 256-QAM, etc.) depending on details of a network. A QAM may also refer to a physical channel modulated according to the schemes.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS, and other bands such as e.g., Bands 12-17 and 71.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a CPE/FWA or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac/ad/ax/ay/ba/be or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term "wireline" includes electrical and optical transmission media such as, without limitation, coaxial cable, CAT-5/6 cable, and optical fiber.

As used herein, the term "xNB" refers to any 3GPP-compliant node including without limitation eNBs (eU-TRAN) and gNBs (5G NR).

Overview

In one exemplary aspect of the disclosure, methods and apparatus for a user device (such as e.g., an enhanced 3GPP-compliant UE or UEe) to utilize downlink transmissions related to a first access technology to enhance the detection and reception of downlink transmissions from a second access technology are disclosed. This enhancement of detection capability provides, inter alia, enhancement of coverage area for the second access technology.

In one variant of these methods and apparatus, transmissions relating both access technologies are multiplexed on a shared frequency channel, such as in the context of 3GPP-compliant systems (i.e., 4G/4.5G LTE and 5G NR). A UEe trying to detect 5G NR transmissions from a base station (gNB) leverages the "easier" detection of certain LTE signals to enhance detection of the 5G NR signals, since the two signals are intrinsically related via the aforementioned multiplexed shared frequency channel.

In one implementation, the LTE PSS (Primary Synchronization Signal) is leveraged due to its reduced complexity as compared to the 5G NR PSS. Moreover, the location of the LTE PSS (or SSS) can indirectly assist a UEe with detection of the NR SSB (Synchronization Signal/PBCH block), such as via reduction of the number of noise-only samples passed to the NR PSS/SSS autocorrelation detector.

In another salient aspect of the disclosure, the NR-enabled UEe is configured to enhance the determination of UL transmit power for the NR PRACH (Preamble Random Access Channel) for initial access by leveraging both LTE and NR DL transmissions. In one implementation, the UE is configured to improve its estimation of DL path loss by measuring LTE PSS/SSS and/or CRS RSRP (Reference Signal Received Power) in addition to the received power of the NR SSB.

Yet further, the present disclosure provides methods and apparatus to enhance detection and power saving by the UEe, such as via monitoring of either common or UE-specific search spaces to potentially obviate PDCCH decoding (which is a more energy-intensive process).

Detailed Description of Exemplary Embodiments

Exemplary embodiments of the apparatus and methods of the present disclosure are now described in detail. While these exemplary embodiments (and the discussion of identified issues present in the prior art) are described in the context of the previously mentioned user devices (e.g., enhanced 3GPP UEs) and wireless access nodes (e.g., gNBs) associated with or supported at least in part by a managed network of a service provider (e.g., MSO and/or MNO networks), other types of radio access technologies ("RATs"), and other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed service area, venue, or other type of premises), the present disclosure may be readily adapted to other types of environments including, e.g., outdoors, commercial/retail, or enterprise domain (e.g., businesses), or even governmental uses. Yet other applications are possible.

Also, while certain aspects such as certain types of PDU sessions are described primarily in the context of the well-known Internet Protocol (described in, inter alia, Internet Protocol DARPA Internet Program Protocol Specification, IETF RCF 791 (September 1981) and Deering et al., Internet Protocol, Version 6 (IPv6) Specification, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the various aspects of the present disclosure contemplate use of quasi-licensed spectrum (such as CBRS spectrum in the 3.5 GHz band (specifically 3,550 to 3,700 MHz) in place or in addition to licensed or unlicensed spectrum, it will be appreciated by those of ordinary skill when provided the present disclosure that the methods and apparatus described herein may be configured to utilize other "quasi-licensed" or shared access systems or other spectrum, including without limitation DSA, LSA, or TVWS systems, and those above 4.0 GHz (e.g., currently proposed allocations up to 4.2 GHz, and even millimeter wave bands such as those between 24 and 100 GHz).

Further, while some aspects of the present disclosure are described in detail with respect to so-called 5G "New Radio" (3GPP Release 15 and TS 38.XXX Series Standards and beyond), such aspects are in some cases access technology "agnostic" and hence may be used across different access technologies, and can be applied to, inter alia, any type of P2MP (point-to-multipoint) or MP2P (multipoint-to-point) technology, including e.g., Qualcomm Multefire.

Other features and advantages of the present disclosure will immediately be recognized by persons of ordinary skill in the art with reference to the attached drawings and detailed description of exemplary embodiments as given below.

Methodologies

Figure 4:
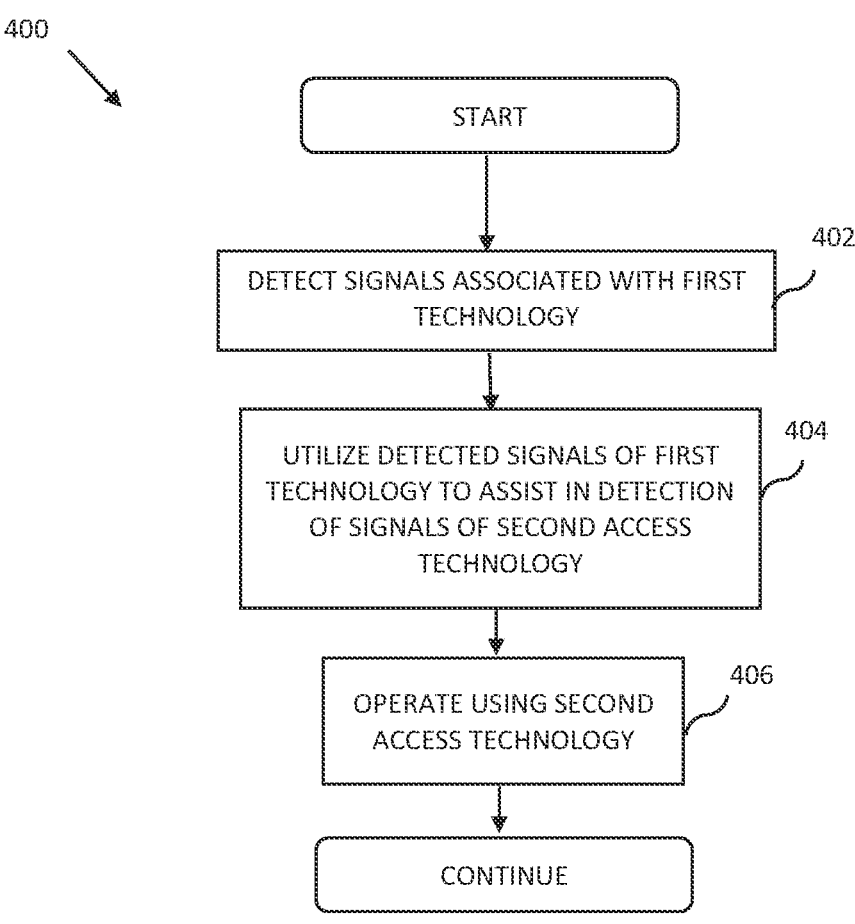
FIG. 4 is a logical block diagram illustrating one embodiment of a generalized method of using signals of a first technology to assist with or enable detection of signals of a second technology, according to the disclosure.

Referring now to FIG. 4, one embodiment of a generalized method of utilizing signals of a first access technology to enhance coverage of a second access technology according to the disclosure is shown and described.

As shown in FIG. 4, the methodology 400 includes first detecting via a device (e.g., an enhanced UE or "UEe" as described in greater detail subsequently herein) one or more signals associated with a first access technology, such as e.g., LTE (step 402). As described in greater detail subsequently herein, the detection of the LTE signals is less complex and more readily performed that corresponding signals for the 5G NR access technology, and hence can be used to facilitate the latter.

Next, per step 404, the detected signals of the first access technology are used to assist in detection of the signals of the second access technology (e.g., 5G NR). As discussed with respect to various exemplary embodiments below, the detection of the first technology signals can also provide useful information as to one or more characteristics of the signals of the second technology.

Lastly, per step 406, the device (e.g., UEe) is operated using the second access technology after connection and session establishment protocols are completed.

Figure 5:
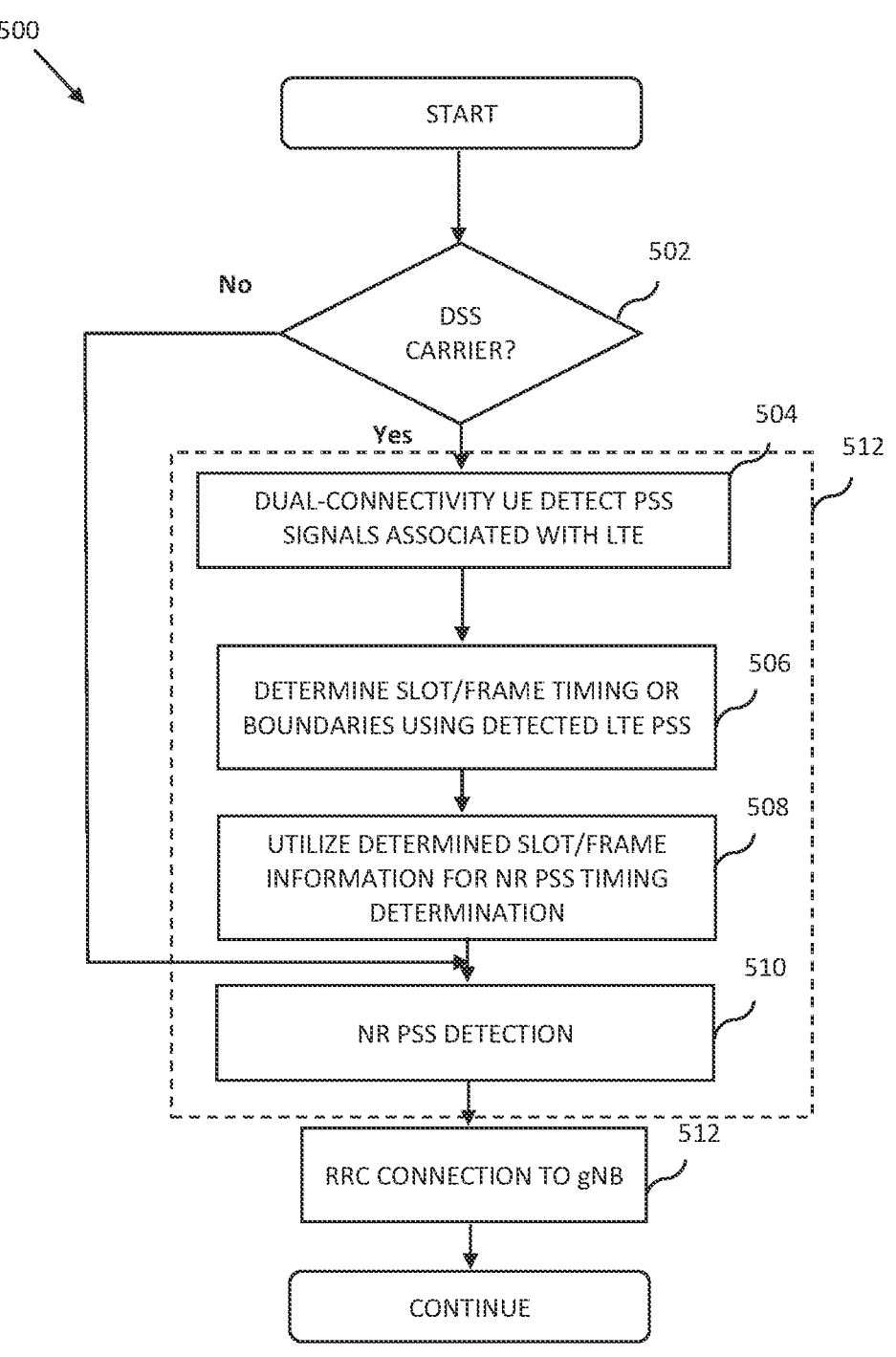
FIG. 5 is a logical flow diagram illustrating one implementation of the general methodology of buffer management of FIG. 4, in the context of a 3GPP enhanced UE (UEe) operating in DSS mode.

Referring now to FIG. 5, one implementation of the generalized method of FIG. 4 is described. It will be appreciated that while described in terms of 3GPP LTE and 5G NR PSS signals as received by a dual connectivity (DC) UEe, the present disclosure is in no way so limited, the use of such access technologies and PSS signals in the DL thereof being merely exemplary.

As shown, the method 500 includes first determining, at the UE, whether DSS mode is being utilized by the gNB/RAN with which the UEe is communicative per step 502. For instance, in one variant, logic within the UE can detect, based on signaling from the gNB, entry into the DSS mode. If the UEe is aware that it is operating on a DSS carrier (e.g., based on the RF band in the case of standalone initial access, or by being configured with a LTE CRS pattern for rate-matching and LTE carrier center frequency via the IE RateMatchPatternLTE-CRS conveyed in IE ServingCell-Config, as described in TS 38.331 V15.8.0, NR; Radio Resource Control, Rel-15, which is incorporated herein by reference in its entirety), the UE can choose to first attempt detection of LTE PSS/SSS.

If DSS mode is used, then the method proceeds to step 504, wherein the DC UE detects the LTE PSS signals transmitted in the multiplexed downlink shared frequency channel (SFC). Specifically, the UEe can use the detected LTE PSS (or SSS) in order to facilitate synchronization with the cell slot and frame boundary (step 506), before attempting to detect the NR SSB per step 510, such as via utilizing the determined slot/frame timing or boundary information for determination of NR PSS timing per step 508. Specifically, the location of LTE PSS/SSS can indirectly assist the UE with detection of the NR SSB.

Figure 5A:
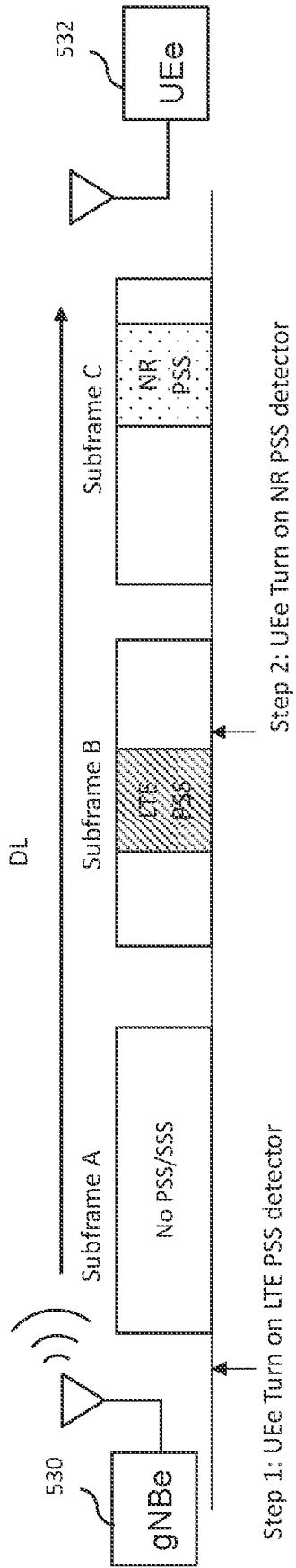
FIG. 5a is graphical illustration of the signal flow in the method of FIG. 5.

FIG. 5a graphically illustrates the foregoing method 500. In FIG. 5a, the gNBe 530 transmits a plurality of subframes (AB/C . . . ) in the downlink, with the subframes having various LTE and NR PSS/SSS data contained therein. As indicated, in one approach, the UEe 532 activates its LTE PSS detector first, and then based on the detection of the LTE PSS, determines when to activate the NR PSS detector so as optimize detection (and power consumption).

It is noted that detection of an NR PSS (or SSS) by an NR UE is necessary for initial access, or when the DC UE is configured with an NR SCG (Secondary Cell Group). LTE PSS detection is typically less complex than NR PSS, since only time-domain hypothesis testing is needed (each of frequency-domain location, spatial transmission filter, and SCS is fixed). Accordingly, the selective use by the DC UE of LTE PSS or SSS detection advantageously allows the UE to obviate the more complex detection of the NR PSS/SSS, which reduces the cell acquisition time, reduces computational overhead (and hence electrical power consumption)

for the UE, as well as enhancing coverage area if both LTE and NR sequences are detected in tandem (via greater processing gain).

It will also be appreciated that while discussed above in the context of a serialized approach, the LTE and NR PSS/SSS detectors can be run in parallel if desired. For instance, in one variant, the normal NR PSS detection can be supplemented by the data obtained from the LTE PSS detection approach discussed above, in effect to allow the NR PSS process to converge more rapidly. For instance, the UEe can look for an equivalent virtual sequence that combines LTE and NR PSS/SSS characteristics. Or, the UEe can look at LTE detector outputs to discard/fine-tune NR detector samples in parallel.

Figure 6:
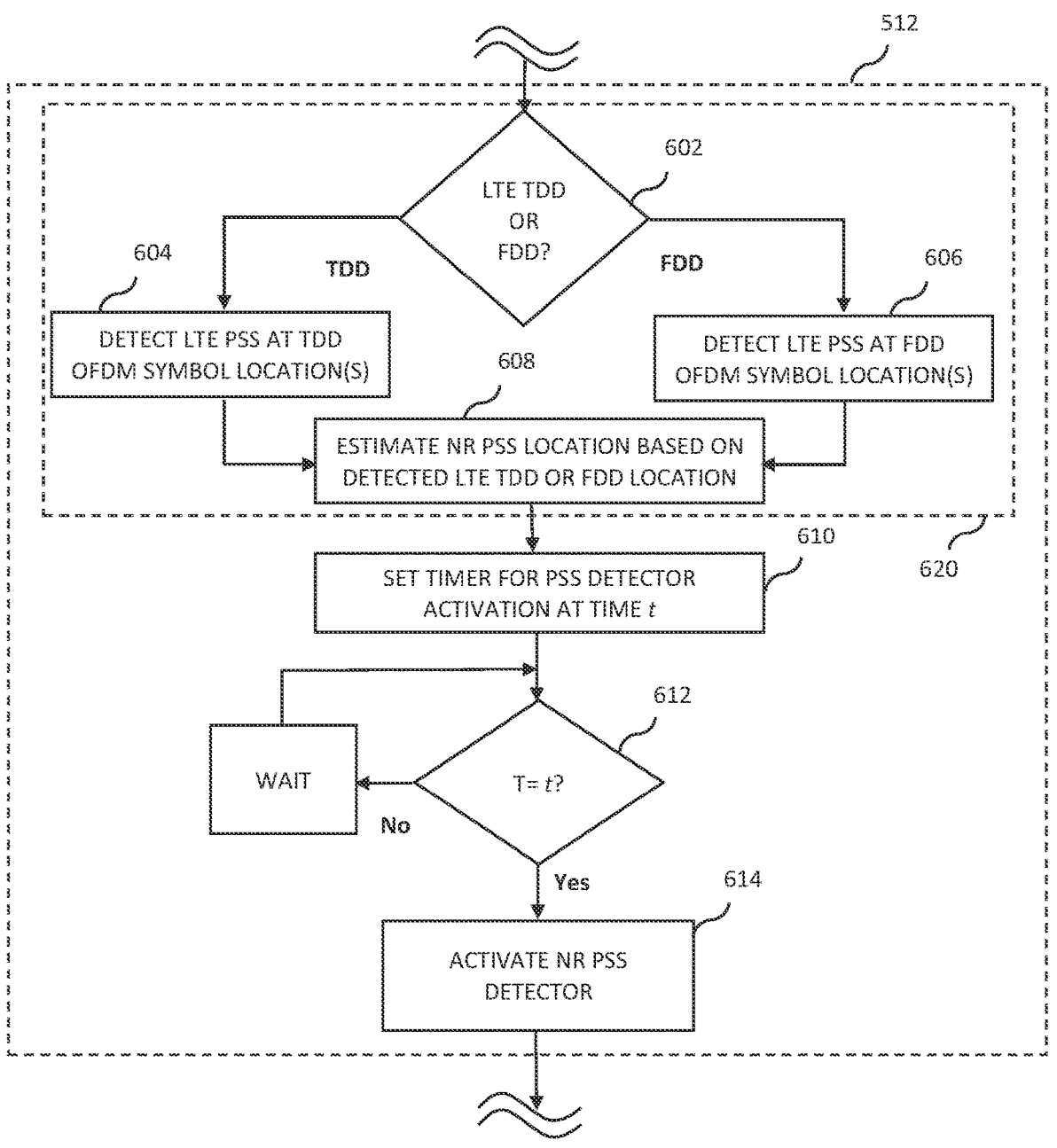
FIG. 6 is a logical flow diagram illustrating one implementation of the methodology of using LTE-based detection of NR signals of FIG. 5.

FIG. 6 illustrates one particular configuration of the PSS detection and processing portion 512 of the method 500 of FIG. 5. As shown in FIG. 6, the exemplary configuration includes first determining whether the UEe is operating in LTE FDD mode or LTE TDD mode (step 602). As a brief aside, for FDD LTE, the PSS is mapped to the last OFDM symbol, and the SSS is mapped to the penultimate symbol in LTE slots 0 and 10. In the case of TDD LTE, the PSS is mapped to the third OFDM symbol in subframes 1 and 6, and the SSS is mapped to the last symbol of slots 1 and 11. The LTE SSS is scrambled differently depending upon the slot number. Moreover, the NR SSB is always located in the first half of a 10 ms frame. These known relationships allow the exemplary DC UEe logic to determine per step 608 the NR PSS (or SSS) timing relative to the detection of the LTE signal(s), whether using the TDD mode data (step 604) or FDD mode data (step 606). These relationships in effect provide a pointer or "hint" for the UEe logic to obtain NR PSS signal location, and hence when to turn on NR PSS detection.

Specifically, as shown, once the NR PSS location is estimated per step 608, a timer (t) is set per step 610, and when the timer value is reached per step 612, the NR detector module is activated per step 614. This approach not only saves power within the UEe (i.e., the greater complexity NR PSS detector is obviated for as long as possible), but also allows the NR detector to operate more efficiently. Specifically, after determining slot and frame boundaries from the LTE PSS/SSS as previously described, the UEe can bypass immediate NR PSS detection if the LTE PSS/SSS is detected in the second half of the frame. This consequently reduces the number of "noise-only" or non-coherent samples passed to the NR PSS/SSS autocorrelation detector, and hence the NR detector's SSB detection probability is increased relative to that without the aforementioned pointer/hint.

It is also recognized that in some cases, the UEe may have to perform LTE PSS/SSS noncoherent combining across multiple LTE PSS/SSS occasions, due to poor downlink radio conditions. Hence, in one variant (FIG. 6a), the TDD or FDD processing of FIG. 6 (step 620) is configured to take detected symbols from two or more occasions and perform a combining of the symbols (steps 624a-628a for TDD, or 624b-6238b for FDD) in order to generate a respective combined detector output statistic, which can be used by the UEe logic to generate an estimate of the NR PSS location (step 630).

Notably, if both LTE and NR PSS/SSS indicate the same PCI (physical cell identifier), then the UEe can use this a priori information to further boost detection probability of the NR PSS/SSS. This is because each PCI corresponds to a unique combination of PSS and SSS sequences. If the UEe reads the PCI for LTE PSS/SSS, then it knows the exact PSS/SSS sequence indices indicated by the NR SSB, and does not need to try all possible NR PSS/SSS hypotheses. The auto/cross-correlation threshold that resulted in LTE PSS/SSS detection can also be used to optimize SSB detection thresholds.

Figure 7:
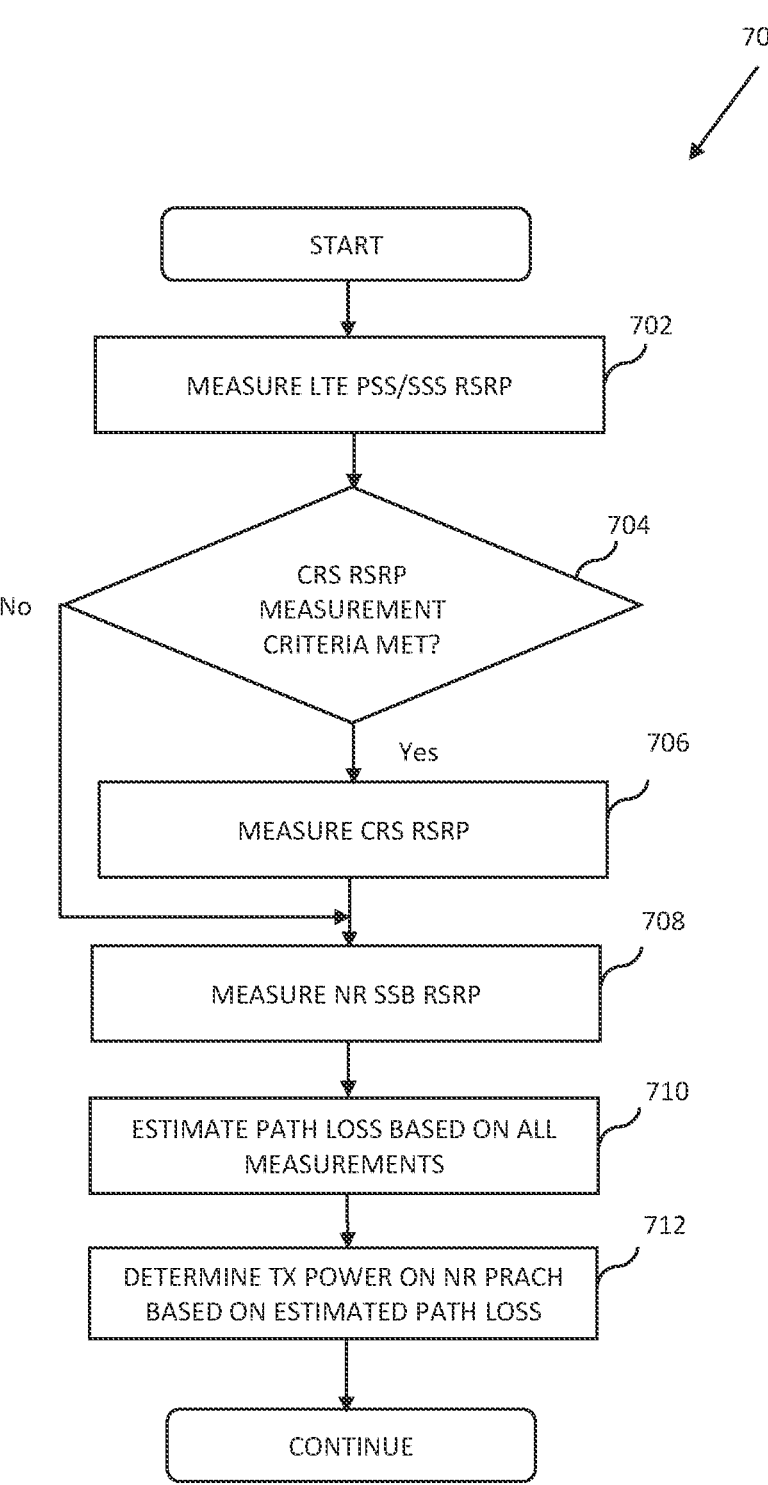
FIG. 7 is a logical block diagram illustrating one embodiment of a method of determining NR UL transmission power (e.g., for PRACH) based on detected power of one or more LTE signals, according to the disclosure.

In another aspect, the NR-enabled UEe can enhance the determination of UL transmit power of the NR PRACH for initial access, by leveraging both LTE and NR DL transmissions. Specifically, the NR PRACH power control algorithm is open loop, and is based partly on estimation of DL path loss from the base station. As illustrated in the exemplary method 700 of FIG. 7, the UEe can improve its estimation of DL path loss by measuring both the LTE PSS/SSS Reference Signal Received Power (RSRP) per step 702 (and/or CRS RSRP per steps 704, 706), and the received power of the NR SSB per step 708. These two (or three, depending on configuration) data points enhance the open loop power control determination of step 712 by providing ostensibly better estimates of DL path loss (step 710) than one reading alone. In one variant, the utilization of CRS RSRP measurement(s) is determined by one or more criteria (step 704), which can relate for example to the sufficiency or confidence of other data used to estimate path loss, whether power consumption is being optimized within the UEe (and hence extra overhead such as CRS RSRP measurements are to be obviated), or yet other factors.

Figure 8:
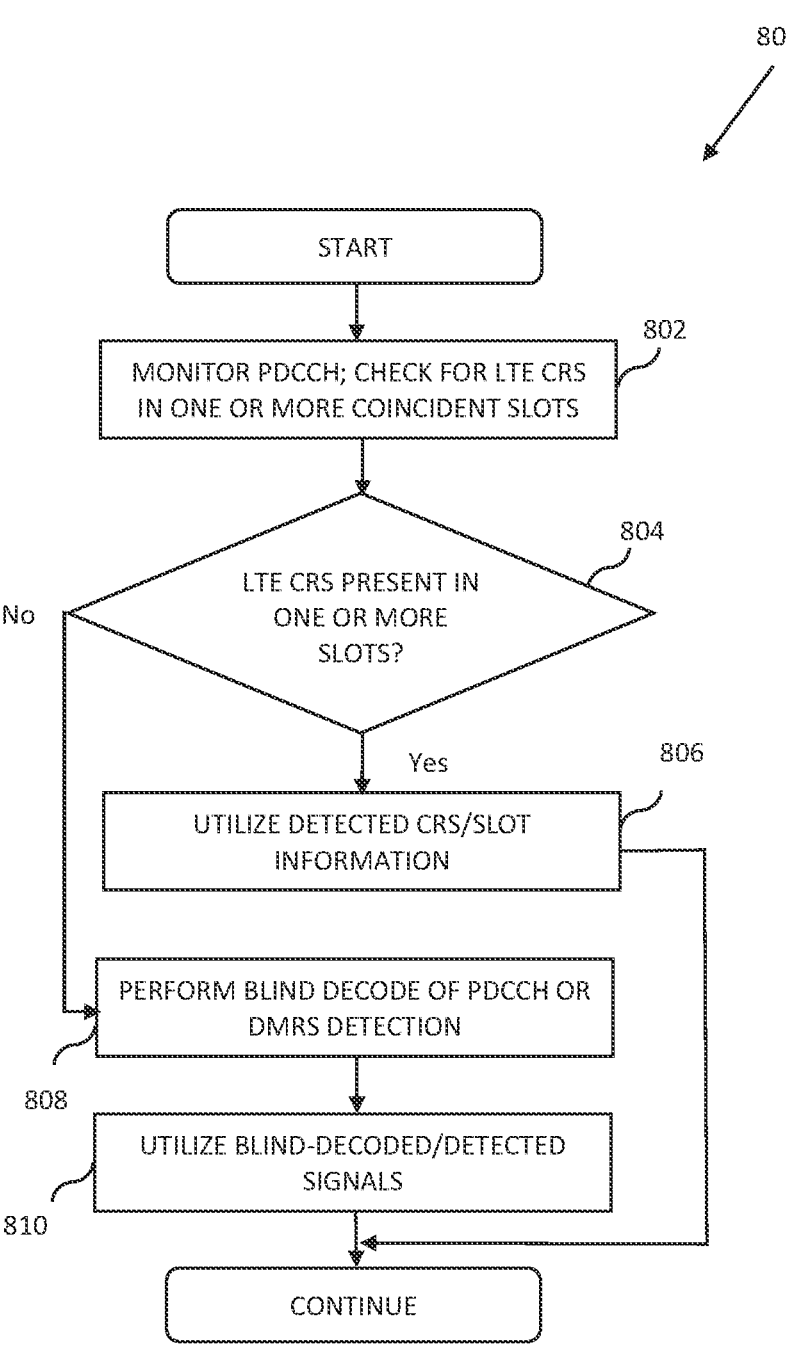
FIG. 8 is a logical block diagram illustrating one embodiment of a method of selectively utilizing blind decoding of NR signals based on the presence of LTE CRS information, according to the disclosure.

In a further aspect, after completing initial access/cell detection based on PSS/SSS, the NR-enabled UEe can leverage LTE CRS for DL transmission detection and potentially power saving. As one example, the UEe may be configured with one or more CORESETs for PDCCH monitoring of either common or UEe-specific search spaces. As shown in the exemplary logical flow 800 of FIG. 8, such UEe can first check for the presence of the LTE CRS in one or more slots that coincide with a PDCCH monitoring occasion per steps 802-804, before trying to blind-decode PDCCH candidates or detect PDCCH DMRS per step 808. Depending on what is detected, the UEe can either use any coincidentally occurring CRS/slot information per step 806, or fall back to the blind detection output per step 810. Since PDCCH decoding is an energy-intensive process, this selective can lead to UEe power savings.

In another aspect, the UEe may be configured to autonomously perform in-sync/out-of-sync evaluations for RLM (radio link monitoring) based on LTE CRS as an additional reliability check that complements its NR RLM configuration. RLM enables the UEe to detect if its serving cell is experiencing poor radio link conditions and if the UEe should initiate connection reestablishment procedures. In a DSS scenario, both LTE and NR signals are transmitted from the same cell, so poor conditions deduced from the LTE signals also apply to the NR signals and vice versa.

Alternate Configurations

It will be appreciated that the various embodiments of the methodologies and apparatus described above with respect to FIGS. 4-8 may be modified and/or further enhanced depending on the particular application and desired functional attributes.

For example, in one such modified configuration, the first RAT discussed above (i.e., that leveraged for NR cell detection) may be an NB-IoT (Narrowband IoT) or eMTC (enhanced Machine Type Communication) network, and the second RAT may be an NR-compliant network as in the prior examples. Within NB-IoT, PSS/SSS and broadcast channels are limited to 1 Resource Block (RB) (or 180 kHz) in bandwidth, while eMTC signals and channels are limited to 6 RBs (1.08 MHz), and are designed for longer-range coverage. Similarly, 5G mMTC (massive MTC) is may be configured for in-carrier deployment of NB-IoT and eMTC that coexist with NR. As such, attributes of these various alternative "lead" or pointer networks may be used in similar fashion to the LTE PSS or SSS detection and utilization described above for assisting NR cell detection, whether along-side of LTE/NR deployments or in stand-alone fashion.

For instance, one exemplary UEe configuration contemplated by the present disclosure includes air interfaces suitable for communication under a variety of different RATs, including LTE, NR, and NB-IoT and/or eMTC/mMTC. Logic within the UEe may be configured to selectively leverage individual ones of the foregoing (e.g., what is available or the best candidate at a given pint in time, such as based on measured signal strength or other attributes) to assist in the NR detection, even handing off between methods in a seamless fashion from the user's perspective. Alternatively, the UEe logic may use two or more different RATs and parameters associated therewith (including selection of heterogeneous parameters which may not suffer certain disabilities as compared to others) in a confirmatory or coordinated/cooperative fashion. Various other permutations of the foregoing will be recognized by those of ordinary skill given the present disclosure.

In another alternative configuration, the DSS carrier may further be deployed within unlicensed or quasi-licensed (e.g., CBRS, C-Band, or other) spectrum. In one such implementation, LTE CRS detection as described previously herein can then be used as a gating factor or condition precedent for other functions such as e.g., group common PDCCH (GC-PDCCH) detection, such as to determine channel occupancy parameters. In other words, the presence of LTE CRS allows the UEe to determine a particular slot or subframe is a downlink slot/subframe, which then indicates the likely presence of other DL channels such as PDCCH.

In yet another alternative configuration, the NR-enabled UEe may be configured to further try to decode LTE PBCH in the LTE detection step (e.g., in step 402 of the method 400 of FIG. 4, after LTE PSS/SSS detection) in order to determine System Frame Number (SFN) which is a necessary component of the initial access procedure. The UEe may further be configured to decode LTE system information blocks (SIBs) to determine cell barring/reselection information, or other useful information for subsequent NR detection and/or other purposes.

In yet a further alternative (or complementary) configuration, the methodologies described with respect to FIGS. 4-8 above may be used in a device other than a UEe; for example, an enhanced gNBe that is a downstream "child" node in an integrated access and backhaul (IAB) deployment may use the foregoing techniques for upstream NR-enabled node detection in the event that the upstream parent node is employing DSS. As a brief aside, IAB is one mechanism for accomplishing reduced CAPEX and OPEX within next-generation architectures such as mmWave NR (FR2). At a high level, the physical attributes/disabilities of mmWave signals necessitate measures such as higher gNB density within a given area. So-called "network disaggregation" (i.e., the separation of the layers of the protocol stack into different physical equipment) and virtualization (i.e., the usage of software-based protocol stack implementations) can help to lower CAPEX/OPEX by reducing the complexity of individual base stations. In IAB scenarios, only a portion of gNBs are backhauled by traditional fiber or other infrastructure. Other (non-connected) gNBs are used to wirelessly relay the backhaul traffic, using e.g., ultra-high bandwidth mmWave links.

As such, it will be apparent that a gNB within this IAB relay architecture, if equipped with the enhancements described herein as applicable, may be able to operate in a generally comparable fashion to the previously described UEe; i.e., it can enhance detection (and coverage) of upstream NR mmWave gNBs (whether enhanced or not), while downstream UEe or gNBe can also benefit similarly. Notably, the ability to increase coverage via enhanced detection is an important benefit, since the gNBs/gNBes within the IAB architecture can ostensibly be placed farther apart and/or in more "challenging" environments in that detection of their signals by UEe or other gNBe devices is improved. This can greatly reduce CAPEX and OPEX for the network operator and service provider.

User Apparatus

FIG. 9 illustrates a block diagram of an exemplary embodiment of an enhanced user apparatus (e.g., 5G NR-enabled UE (UEe)) apparatus 900, useful for operation in accordance with the present disclosure.

In one exemplary embodiment as shown, the UEe 900 includes, inter alia, a processor apparatus or subsystem 902, a program memory module 906 which includes enhanced SI/LBT logic 911, as well as a 4G/5G NR stack 912 (here each implemented as software or firmware operative to execute on the processor 902), and wireless radio interface (s) 905 for communications with the relevant RANs (e.g., 5G-NR RAN). The RF interface front end(s) 917 and antennae 919 are each configured to comply with the relevant PHY standards which it supports. The antenna(s) 919 of the UEe radios may include multiple spatially diverse individual elements in e.g., a MIMO- or MISO-type configuration, such that spatial diversity of the received signals can be utilized. Moreover, a phased array or similar arrangement can be used for spatial resolution within the environment, such as based on time delays associated with signals received by respective elements. Likewise, spatial multiplexing may be used to, inter alia, enhance data throughput.

In one embodiment, the processor apparatus 902 may include one or more of a digital signal processor, microprocessor, field-programmable gate array, GPU, or plurality of processing components mounted on one or more substrates. The processor apparatus 902 may also comprise an internal cache memory, and modem/baseband chipset 903. The modem 903 processes the baseband control and data signals for transmission and reception via the RF frond end module 917.

As indicated, the UEe includes LTE/NR detection logic 911 in the program memory, which is in communication with the processing subsystem, where the former may include memory which may comprise, e.g., SRAM, flash and/or SDRAM components. The memory module 906 may implement one or more of direct memory access (DMA) type hardware, so as to facilitate data accesses as is well known in the art. The memory module of the exemplary embodiment contains one or more computer-executable instructions that are executable by the processor apparatus 902. A mass storage device (e.g., HDD or SSD, or NAND/NOR flash or the like) is also provided as shown.

Other embodiments may implement the LTE/NR detection and processing functionality within dedicated hardware, logic, and/or specialized co-processors (not shown).

As noted, the LTE/NR detection logic 911 of the exemplary embodiment is configured to use the UEe-based (or gNBe-based) methodologies described previously herein for detection of signals associated with LTE or other "pointer" RATs and utilization of those signals for, among other things, NR detection and subsequent connection.

The UEe 900 may also be configured to utilize positioning location data generated by an internal receiver 909 (e.g., GPS, GLONASS, or similar, or yet other operating principles) to transmit location data such as coordinates to a gNBe, SMF, or other entity in support of location-related functions, although it will be appreciated that the UEe's location can also be derived by network-based means.

In some embodiments, the UEe also utilizes memory 906 or other storage 907 configured to at least temporarily hold a number of data relating to the various network associations, detected NR gNB/gNBe devices, bands and rules, in support of the various functions described herein. For instance, the UEe may maintain a list of prior gNB/gNBe detections as well as data relating to the corresponding LTE or other pointer network detection; e.g., a correlation of what worked most efficiently or effectively in prior NR detection/connection efforts. In other embodiments, application program interfaces (APIs) such as those included in an MSO-provided application or those natively available on the UEe may also reside in the internal cache or other memory 906. Such APIs may include common network protocols or programming languages configured to enable communication with the UEe 900 and other network entities.

Base Station Apparatus

Figure 10:
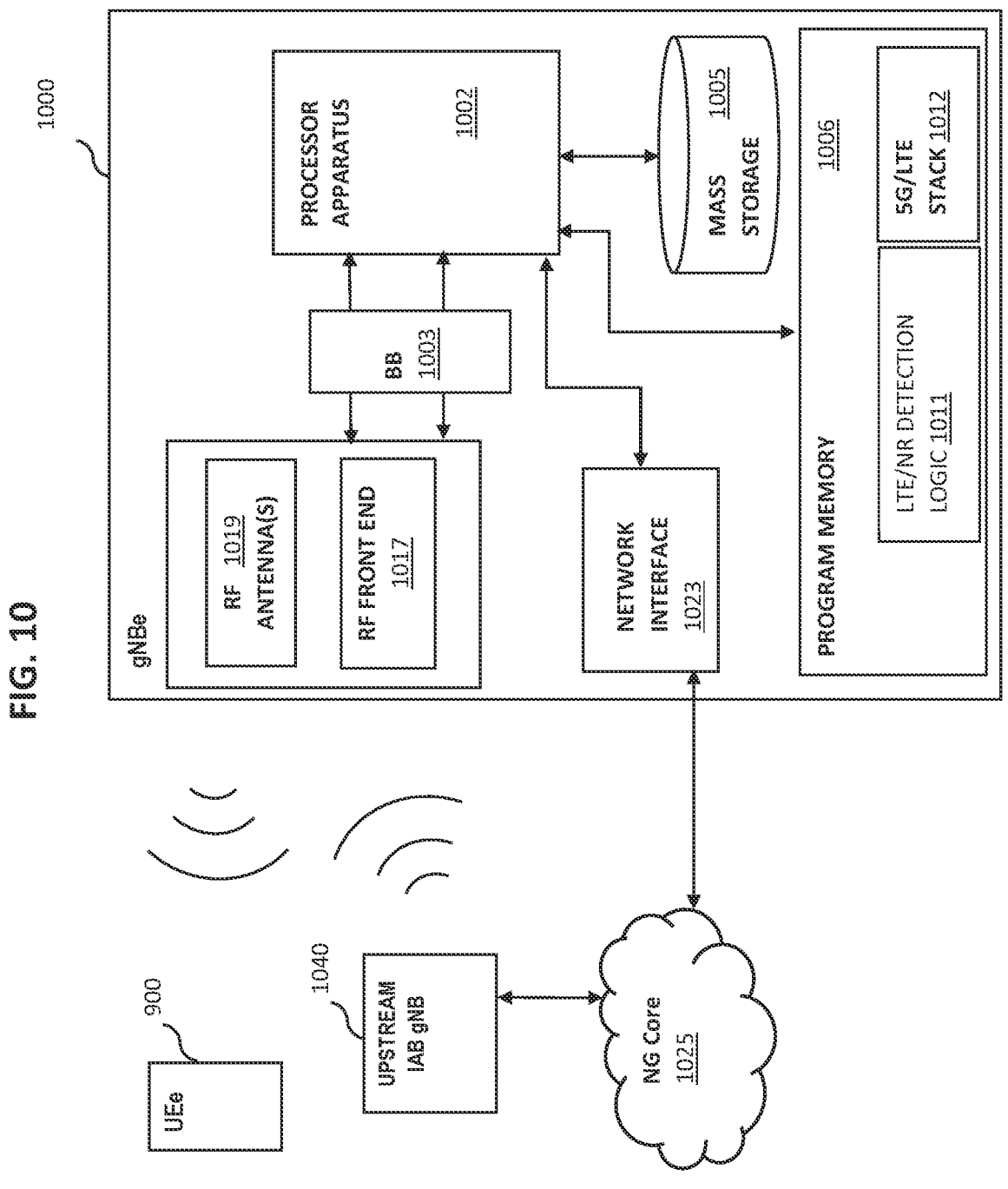
FIG. 10 is functional block diagram illustrating one embodiment of an enhanced wireless access node (e.g., 5G NR compliant enhanced gNB) according to the disclosure.

FIG. 10 illustrates a block diagram of an exemplary embodiment of an enhanced base station apparatus (e.g., 5G-enabled gNBe) 1000, useful for operation in accordance with the present disclosure.

In one exemplary embodiment as shown, the base station 1000 includes, inter alia, a processor apparatus or subsystem 902, a program memory module 906, a local mass storage device 905, and network interfaces 923 for communications with the relevant 5G-NR RAN or other entities such as an AMF and the enhanced UEe 900 described previously herein. As shown in FIG. 10, the gNBe 1000 may also communicate with an upstream or parent gNB/gNBe 1040 such as via an TAB configuration of the type previously described herein.

In one embodiment, the processor apparatus 902 may include one or more of a digital signal processor, microprocessor, field-programmable gate array, GPU, or plurality of processing components mounted on one or more substrates. The processor apparatus 902 may also comprise an internal cache memory. In addition, the gNBe may include LTE/NR detection logic 911 in the program memory which is in communication with the processing subsystem (as well as a 4G/5G stack 912 to implement other 4G and 5G NR related functions of the gNBe). In one example, the detection logic 911 maybe implemented as software or firmware stored on a storage device and executed on the processor 902.

The processing subsystem 1002 is in communication with a program memory module or subsystem 1006, where the latter may include memory which may comprise, e.g., SRAM, flash and/or SDRAM (e.g., GDDR5 or GDDR6) components. The memory module 1006 may implement one or more of direct memory access (DMA) type hardware, so as to facilitate data accesses as is well known in the art. The memory module of the exemplary embodiment contains one or more computer-executable instructions that are executable by the processor apparatus 1002. A mass storage device (e.g., HDD or SSD, or NAND/NOR flash or the like) 1005 is also provided as shown.

The processor apparatus 1002 is configured to execute at least one computer program stored in memory 1006 (e.g., the logic of the detection module according to the methods of FIGS. 4-8, herein, in the form of software or firmware that implements the various functions). Other embodiments may implement such functionality within dedicated hardware, logic, and/or specialized co-processors (not shown).

In some embodiments, the logic 911 also utilizes memory 906 or other storage 905 configured to temporarily and/or locally hold a number of data relating to the various PCI, RNTI, SSBs, rules, policies, locations, bands, and other data for the various UEe 900 and IAB gNBs 1040 (whether alone or in cooperation with another database) which it services under the LTE and/or NR standard(s). In other embodiments, application program interfaces (APIs) may also reside in the internal cache or other memory 1006. Such APIs may include common network protocols or programming languages configured to enable communication between with other network entities (e.g., via API "calls" to or from the NG Core or other entities, such as MSO based headend control entities or processes, such as to implement desired frequency spectrum plans or policy changes, or implement aspects of IAB operation).

It will also be appreciated that while described primarily with respect to a unitary gNBe-CUe entity or device 1000 as shown in FIG. 10, the present disclosure is in no way limited to such architectures. For example, the techniques described herein may be implemented as part of a distributed or dis-aggregated or distributed CUe entity (e.g., one wherein the user plane and control plane functions of the CUe are dis-aggregated or distributed across two or more entities such as a CUe-C(control) and CUe-U (user)), and/or other functional divisions are employed.

It is also noted that heterogeneous architectures of eNBs or femtocells (i.e., E-UTRAN LTE/LTE-A Node B's or base stations) and gNBes may be utilized consistent with the methods and architectures described herein. For instance, a given DUe may act (i) solely as a DUe (i.e., 5G NR PHY node) and operate outside of an E-UTRAN macrocell, or (ii) be physically co-located with an eNB or femtocell and provide NR coverage within a portion of the eNB macrocell coverage area, or (iii) be physically non-collocated with the eNB or femtocell, but still provide NR coverage within the macrocell coverage area.

In the 5G NR model, the DU(s) comprise logical nodes that each may include varying subsets of the gNB functions, depending on the functional split option. DU operation is controlled by the CU (and ultimately for some functions by the NG Core). Split options between the DUe and CUe in the present disclosure may include for example:

Option 1 (RRC/PCDP split)
Option 2 (PDCP/RLC split)
Option 3 (Intra RLC split)
Option 4 (RLC-MAC split)
Option 5 (Intra MAC split)
Option 6 (MAC-PHY split)
Option 7 (Intra PHY split)
Option 8 (PHY-RF split)

Under Option 1 (RRC/PDCP split), the RRC (radio resource control) is in the CUe while PDCP (packet data convergence protocol), RLC (radio link control), MAC, physical layer (PHY) and RF are kept in the DUe, thereby maintaining the entire user plane in the distributed unit.

Under Option 2 (PDCP/RLC split), there are two possible variants: (i) RRC, PDCP maintained in the CUe, while RLC, MAC, physical layer and RF are in the DU(s); and (ii) RRC, PDCP in the CUe (with split user plane and control plane stacks), and RLC, MAC, physical layer and RF in the DUe's.

Under Option 3 (Intra RLC Split), two splits are possible: (i) split based on ARQ; and (ii) split based on TX RLC and RX RLC.

Under Option 4 (RLC-MAC split), RRC, PDCP, and RLC are maintained in the CUe, while MAC, physical layer, and RF are maintained in the DUe's.

Under Option 5 (Intra-MAC split), RF, physical layer and lower part of the MAC layer (Low-MAC) are in the DUe's, while the higher part of the MAC layer (High-MAC), RLC and PDCP are in the CUe.

Under Option 6 (MAC-PHY split), the MAC and upper layers are in the CUe, while the PHY layer and RF are in the DUe's. The interface between the CUe and DUe's carries data, configuration, and scheduling-related information (e.g. Modulation and Coding Scheme or MCS, layer mapping, beamforming and antenna configuration, radio and resource block allocation, etc.) as well as measurements.

Under Option 7 (Intra-PHY split), different sub-options for UL (uplink) and DL (downlink) may occur independently. For example, in the UL, FFT (Fast Fourier Transform) and CP removal may reside in the DUe's, while remaining functions reside in the CUe. In the DL, iFFT and CP addition may reside in the DUe, while the remainder of the PHY resides in the CUe.

Finally, under Option 8 (PHY-RF split), the RF and the PHY layer may be separated to, inter alia, permit the centralization of processes at all protocol layer levels, resulting in a high degree of coordination of the RAN. This allows optimized support of functions such as CoMP, MIMO, load balancing, and mobility.

The foregoing split options are intended to enable flexible hardware implementations which allow scalable cost-effective solutions, as well as coordination for e.g., performance features, load management, and real-time performance optimization including changes to the LTE/NR detection logic described above. Moreover configurable functional splits enable dynamic adaptation to various use cases and operational scenarios. Factors considered in determining how/when to implement such options can include for example: (i) QoS requirements for offered services (e.g. low latency, high throughput); (ii) support of requirements for user density and load demand per given geographical area (which may affect RAN coordination); (iii) availability of transport and backhaul networks with different performance levels (including membership in IABs); (iv) application type (e.g. real-time or non-real time); (v) feature requirements at the Radio Network level (e.g. Carrier Aggregation), and (vi) power conservation at UEes.

Service Provider Networks

Figure 11:
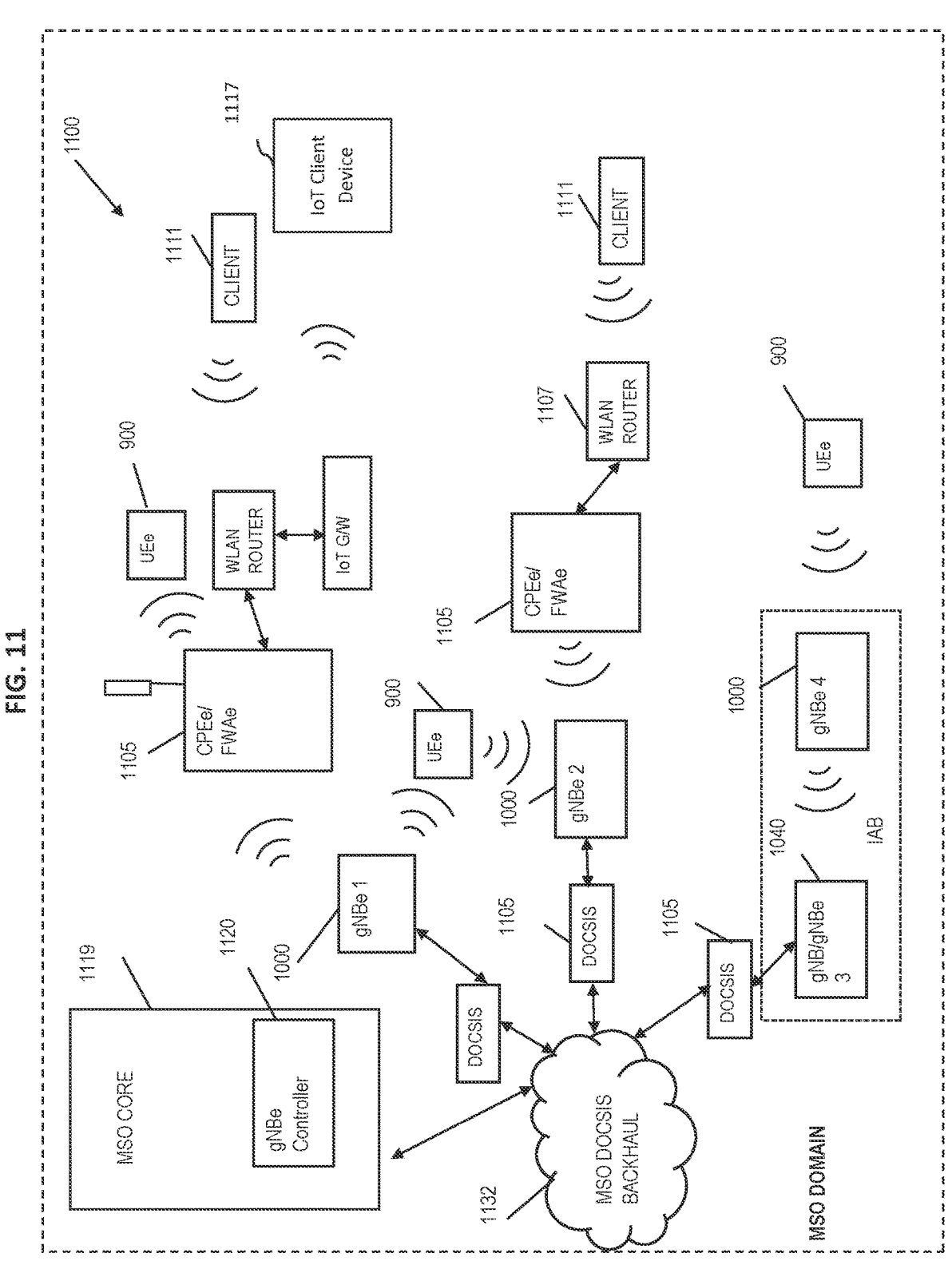
FIG. 11 is a functional block diagram of a first exemplary MSO network architecture useful in conjunction with various principles described herein.

FIG. 11 illustrates a typical service provider network configuration useful with the features of the apparatus and methods described herein. It will be appreciated that while described with respect to such network configuration, the methods and apparatus described herein may readily be used with other network types and topologies, whether wired/wireline or wireless, managed or unmanaged.

The exemplary service provider network 1100 is used in the embodiment of FIG. 11 to provide backhaul and Internet access from the service provider's wireless access nodes (e.g., Node B NR-U) devices such as the overlapping LTE/NR detection-enabled capable gNBe's 1000 previously described herein, Wi-Fi APs, and FWA devices operated or maintained by the MSO), and one or more stand-alone or embedded cable modems (CMs) 1133 in data communication therewith. It will be appreciated that the gNBe and UEe devices described herein may operate on licensed, unlicensed, or quasi-licensed/shared access spectrum while utilizing the underlying 3GPP 4G and 5G NR/NR-U based protocols described herein.

The individual gNBe's 1000 are backhauled by the CMs 1105 to the MSO core via e.g., CMTS or CCAP MHAv2/RPD or other such architecture, and the MSO core 1132 includes at least some of the EPC/5GC core functions previously described, as well as an optional gNBe controller process 1120 as shown. The controller process is in one embodiment a network-based server which communicates with the various gNBe within the MSO infrastructure so as to effect various functions including in some cases the logic of FIGS. 4-8 as previously described, as well as IAB logic where utilized (see lower portion of FIG. 11); e.g., when/under what conditions to implement LTE/NR detection and/or IAB functionality. The controller 1120 can communicate with the gNBe's via the primary backhaul. The gNBe's 1000 may also be configured to fail to their internal logic when communication with the network controller process is lost, in effect self-moderating for decisions of detection, cell coverage and OSI management modes and operation.

While not shown, it will also be appreciated that the logic of the UEe 900 relating to LTE/NR detection operation may also be communicative with and controlled at least in part by the network controller 1120 in some embodiments, such as via established connections between the UEe and one or more gNBes, or alternatively via another backhaul such as WLAN link.

Client devices 1111 such as tablets, smartphones, Smart-TVs, etc. at each premises are served by respective WLAN routers 1107, IoT gateways 1117, and NR-U or CBRS capable CPEe/FWAe 1105, the latter functioning in effect as stationary UEes and which are backhauled to the MSO core or backbone via their respective gNBes.

Notably, in the embodiment of FIG. 11, all of the necessary components for support of the wireless service provision and backhaul functionality are owned, maintained and/or operated by the common entity (e.g., cable MSO). The approach of FIG. 11 has the advantage of, inter alia, giving the MSO complete control over the entire service provider chain so as to optimize service to its specific customers (versus the non-MSO customer-specific service provided by an MNO), and the ability to construct its architecture to optimize incipient 5G NR functions such as network slicing, gNB DUe/CUe Option "splits" within the infrastructure, IAB operation of certain cells (including placement of those cells), selection or configuration of subsets or groups of gNBe (or their individual DUe) which can participate in coordinated NR detection management, RRC connection processes, etc.

Figure 12:
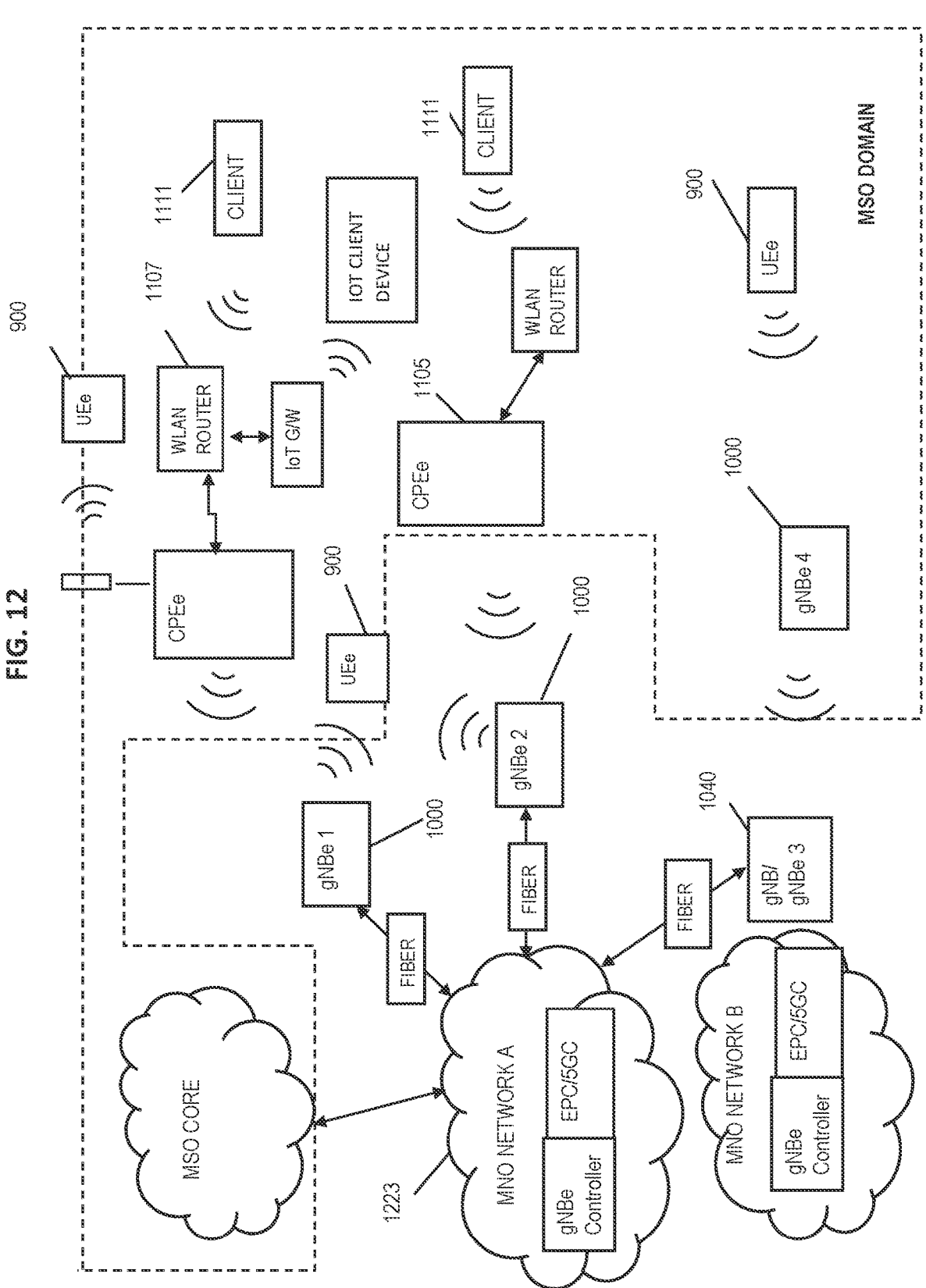
FIG. 12 is a functional block diagram of an exemplary MNO network architecture useful in conjunction with various principles described herein, wherein respective portions of the infrastructure are managed or operated by the MSO and one or more MNOs.

FIG. 12 illustrates another embodiment, highlighting one possible relationship between an MSO architecture and an MNO architecture. As shown, the MSO service domain extends only to the UEe/CPEe/FWAe and served premises and the MSO core functions, while other functions such as 3GPP EPC/E-UTRAN or 5GC and NG-RAN functionality, as well as gNBe and controller functions if utilized, are provided by one or more MNO networks 1232 operated by MNOs (may belong to the same or different operators), including in some embodiments with which the MSO has a service agreement. As illustrated, the MNO(s) may also provide IAB capabilities to the MSO nodes.

In this approach, the controller server 1120 (where utilized) is maintained and operated by the MNO (since the MNO maintains cognizance over at least some of the gNBe's 1000), although this is not a requirement, and the present disclosure contemplates embodiments where the controller function is maintained by the MSO or even a third party. The approach of FIG. 12 (i.e., coordination of MSO and MNO networks) has the advantage of, inter alia, avoiding more CAPEX by the MSO, including duplication of infrastructure which may already service the area of interest, including reduced RF interference due to addition of extra (and ostensibly unnecessary) gNBe's or other transceivers.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized user device configured to communicate with a wireless network via at least one access node, the at least one access node supporting at least first and second wireless access technologies, the computerized user device comprising:

processor apparatus;

wireless interface apparatus in data communication with the processor apparatus and configured to transmit and receive wireless signals in one or more radio frequency (RF) bands; and storage apparatus in data communication with the processor apparatus, the storage apparatus comprising at least one computer program having a plurality of instructions, the plurality of instructions configured to, when executed by the processor apparatus, cause the computerized user device to:

receive at least one data element from the at least one access node via the first wireless access technology;

process the received at least one data element to produce information facilitating detection of signals transmitted by the at least one access node using the second wireless access technology different from the first wireless access technology; and utilize the information as part of the detection of the signals, the utilization of the information as part of the detection of the signals comprising utilizing at least one of a timing relationship or a known channel spacing within a subframe to infer a presence of a second data element present within the signals.

2. The computerized user device of claim 1, wherein:

the at least one access node comprises a 5G NR (New Radio)-compliant gNB (gNode B) operating in a DSS (Dynamic Spectrum Sharing) mode;

the one or more RF bands comprises one or more RF bands within FR1 (Frequency Range 1); and the computerized user device comprises a DSS-capable 5G NR-compliant UE (user equipment) capable of also receiving and decoding 3GPP LTE (Long Term Evolution) signals within the one or more RF bands.

3. The computerized user device of claim 1, wherein the at least one data element comprises at least one of a Primary Synchronization Signal (PSS) or a Secondary Synchronization Signal (SSS).

4. The computerized user device of claim 1, wherein the utilization of the information as part of the detection of the signals comprises using information relating to a location of the at least one data element to reduce a complexity of detection of a data element within the signals by at least a reduction of a number of noise-only samples passed to an autocorrelation detector associated with the second wireless access technology.

5. The computerized user device of claim 1, wherein the wireless network comprises a network utilizing quasi-licensed radio frequency (RF) spectrum within a CBRS (Citizens Broadband Radio Service) band, and the computerized user device comprises a CBRS-compliant FWA (fixed wireless access) device disposed at a user premises.

6. A computerized access node configured for use within a wireless network and configured for wireless communication with a plurality of computerized user devices and at least one other computerized access node, the computerized access node comprising:

processor apparatus;

wireless interface apparatus in data communication with the processor apparatus and configured to transmit and receive wireless signals in one or more radio frequency (RF) bands; and storage apparatus in data communication with the processor apparatus, the storage apparatus comprising at least one computer program having a plurality of instructions, the plurality of instructions configured to, when executed by the processor apparatus, cause the computerized access node to:

receive at least one data element from the at least one other computerized access node via a first wireless access technology, the at least one data element comprising synchronization or scheduling information including timing parameters associated with downlink or reference transmissions of the first wireless access technology;

derive, from the timing parameters, a predicted temporal relationship defining an expected interval during which the at least one other computerized access node will transmit signals using a second wireless access technology different from the first wireless access technology;

schedule activation of a receiver of the second wireless access technology based on the predicted temporal relationship to perform detection of the signals during the expected interval; and identify, based on the detection of the signals, comprising detection of the at least one other computerized access node as a candidate or upstream node for coordinated communication or backhaul connectivity within the wireless network.

7. The computerized access node of claim 6, wherein the computerized access node and the at least one other computerized access node comprise part of an IAB (Integrated Access Backhaul).

8. The computerized access node of claim 7, wherein the the plurality of instructions are further configured to, when executed by the processor apparatus, cause the computerized access node to:

utilize the at least one other computerized access node as the backhaul to a core of the wireless network.

9. The computerized access node of claim 8, wherein:

the utilization of the at least one other computerized access node as the backhaul to the core of the wireless network comprises use of mmWave signals within 3GPP FR2 (Frequency Range 2); and the first wireless access technology is configured to operate in FR1 (Frequency Range 1) only.

10. The computerized access node of claim 6, wherein the computerized access node comprises a 5G NR gNB (gNBe) having at least one central unit (CU) and a plurality of enhanced distributed unit (DUe) in data communication therewith.

11. The computerized access node of claim 6, wherein the scheduling of the receiver activation comprises gating a correlation detector to limit processing of noise-only samples outside the expected interval.

12. The computerized access node of claim 6, wherein the plurality of instructions are further configured to, when executed by the processor apparatus, cause the computerized access node to:

determine slot or frame timing of the first wireless access technology based on the at least one data element and aligns detection of the signals of the second wireless access technology relative to the determined slot or frame timing.

13. The computerized access node of claim 6, wherein the plurality of instructions are further configured to, when executed by the processor apparatus, cause the computerized access node to:

store timing-relationship information obtained from a plurality of first wireless access technologies and selects one thereof based on a relative timing stability or accuracy associated with a corresponding synchronization reference.

14. The computerized access node of claim 6, wherein the plurality of instructions are further configured to, when executed by the processor apparatus, cause the computerized access node to:

adjust the predicted temporal relationship based on a measured or estimated timing offset between the first and second wireless access technologies to align detection with an expected arrival time of the signal of the second wireless access technology.

15. The computerized access node of claim 6, wherein the plurality of instructions are further configured to, when executed by the processor apparatus, cause the computerized access node to:

activate a detector of the second wireless access technology when a correlation confidence associated with a detected signal of the first wireless access technology exceeds a prescribed threshold.

16. The computerized access node of claim 6, wherein the plurality of instructions are further configured to, when executed by the processor apparatus, cause the computerized access node to:

adjust the expected interval for detection based on an observed drift or offset between timing of the first and second wireless access technologies.

17. A computerized method of data processing by a user device, the computerized method comprising:

receiving at least one data element from a at least one access node via a first wireless access technology;

processing the at least one data element to produce information facilitating detection of signals transmitted by the at least one access node using a second wireless access technology; and utilizing the information as part of the detection of the signals, the utilizing of the information as part of the detection of the signals comprising utilizing information relating to a location of the at least one data element to reduce a complexity of detection of a data element within the signals by at least a reduction of a number of noise-only samples passed to an autocorrelation detector associated with the second wireless access technology.

18. The computerized method of claim 17, wherein the utilizing of the information relating to the location of the at least one data element to reduce the complexity of detection of the data element within the signals comprises utilizing a first pointer technology which has reduced complexity of detection relative to using the second wireless access technology to simplify processing subsequently conducted as part of cell detection associated with the second wireless access technology.

19. The computerized method of claim 17, wherein:

the at least one access node comprises a 5G NR (New Radio)-compliant gNB (gNode B) operating in a DSS (Dynamic Spectrum Sharing) mode; and the user device comprises a DSS-capable 5G NR-compliant UE (user equipment) capable of also receiving and decoding 3GPP LTE (Long Term Evolution) signals within one or more RF bands, the one or more RF bands comprises one or more RF bands within FR1 (Frequency Range 1).

20. The computerized method of claim 17, wherein the at least one data element comprises at least one of a Primary Synchronization Signal (PSS) or a Secondary Synchronization Signal (SSS).

* * * * *